(12) United States Patent
Nair et al.

(10) Patent No.: US 11,964,242 B2
(45) Date of Patent: Apr. 23, 2024

(54) ZEOLITE MEMBRANES, MOLECULAR SEPARATION METHODS, AND MANUFACTURING PROCESSES FOR ZEOLITE MEMBRANES

(71) Applicant: Georgia Tech Research Corporation, Atlanta, GA (US)

(72) Inventors: Sankar Nair, Atlanta, GA (US); Shaowei Yang, Atlanta, GA (US); Christopher W. Jones, Atlanta, GA (US); Byunghyun Min, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 258 days.

(21) Appl. No.: 17/602,490

(22) PCT Filed: Apr. 9, 2020

(86) PCT No.: PCT/US2020/027426
§ 371 (c)(1),
(2) Date: Oct. 8, 2021

(87) PCT Pub. No.: WO2020/210460
PCT Pub. Date: Oct. 15, 2020

(65) Prior Publication Data
US 2022/0203307 A1    Jun. 30, 2022

Related U.S. Application Data

(60) Provisional application No. 62/853,434, filed on May 28, 2019, provisional application No. 62/831,388, filed on Apr. 9, 2019.

(51) Int. Cl.
*B01D 71/02* (2006.01)
*B01D 53/22* (2006.01)
*B01D 69/12* (2006.01)

(52) U.S. Cl.
CPC ........ *B01D 71/028* (2013.01); *B01D 53/228* (2013.01); *B01D 69/12* (2013.01);
(Continued)

(58) Field of Classification Search
None
See application file for complete search history.

(56) References Cited

U.S. PATENT DOCUMENTS

| | | | | |
|---|---|---|---|---|
| 2010/0116130 A1* | 5/2010 | Carreon | ............... | B01D 71/028 95/45 |
| 2014/0352533 A1* | 12/2014 | Falconer | ............... | B01D 71/028 427/244 |

(Continued)

FOREIGN PATENT DOCUMENTS

| | | | | |
|---|---|---|---|---|
| CN | 108579449 A | * | 9/2018 | ........... B01D 53/228 |
| WO | 2019030322 A1 | | 2/2019 | |

OTHER PUBLICATIONS

English language machine translation for CN 108579449 A. Retrieved from translationportal.epo.org on Sep. 14, 2023. (Year: 2023).*

(Continued)

*Primary Examiner* — Jason M Greene
(74) *Attorney, Agent, or Firm* — Troutman Pepper Hamilton Sanders LLP; Ryan A. Schneider; Dustin B. Weeks

(57) ABSTRACT

Disclosed are methods of manufacturing a zeolite membrane, comprising: providing at least one porous substrate; and coating the at least one porous substrate with a membrane. In some embodiments, the method further comprises
(Continued)

hydrothermally treating the membrane with a first hydrothermal treatment step with tetrapropylammonium fluoride (TPAF) and a second hydrothermal treatment step with tetraethylammonium hydroxide (TEAOH). In some embodiments, coating the substrate with a membrane comprises surrounding at least a portion of the at least one porous substrate with a precursor gel, the gel comprising a gel phase and a plurality of CHA or MFI crystals; heating the at least one porous substrate and the precursor gel; washing the at least one porous substrate; drying the at least one porous substrate; and calcining the at least one porous substrate.

34 Claims, 15 Drawing Sheets

(52) U.S. Cl.
CPC .. *B01D 2257/504* (2013.01); *B01D 2257/702* (2013.01); *B01D 2323/08* (2013.01); *B01D 2323/10* (2013.01); *B01D 2325/02* (2013.01); *B01D 2325/04* (2013.01); *B01D 2325/20* (2013.01)

(56) References Cited

U.S. PATENT DOCUMENTS

| | | | |
|---|---|---|---|
| 2014/0360938 A1* | 12/2014 | Hayashi | B01D 71/028 210/500.25 |
| 2015/0044130 A1 | 2/2015 | Tang et al. | |
| 2015/0045206 A1* | 2/2015 | Tsapatsis | B01D 71/028 524/450 |
| 2015/0376019 A1* | 12/2015 | Tsapatsis | C01B 33/12 423/335 |
| 2017/0173539 A1 | 6/2017 | Tsapatsis et al. | |
| 2018/0111837 A1 | 4/2018 | Tsapatsis et al. | |
| 2018/0326365 A1 | 11/2018 | Choi et al. | |

OTHER PUBLICATIONS

International Search Report and Writtin Opinion fomr PCT/US2020/027426 dated Jul. 16, 2020.

Min, et al., Continuous Zeolite MFI Membranes Fabricated from 2D MFI Nanosheets on Ceramic Hollow Fibers, Angewandte Chemie International Edition, vol. 58 Issue 24 (Apr. 9, 2019) pp. 8201-8205.

* cited by examiner

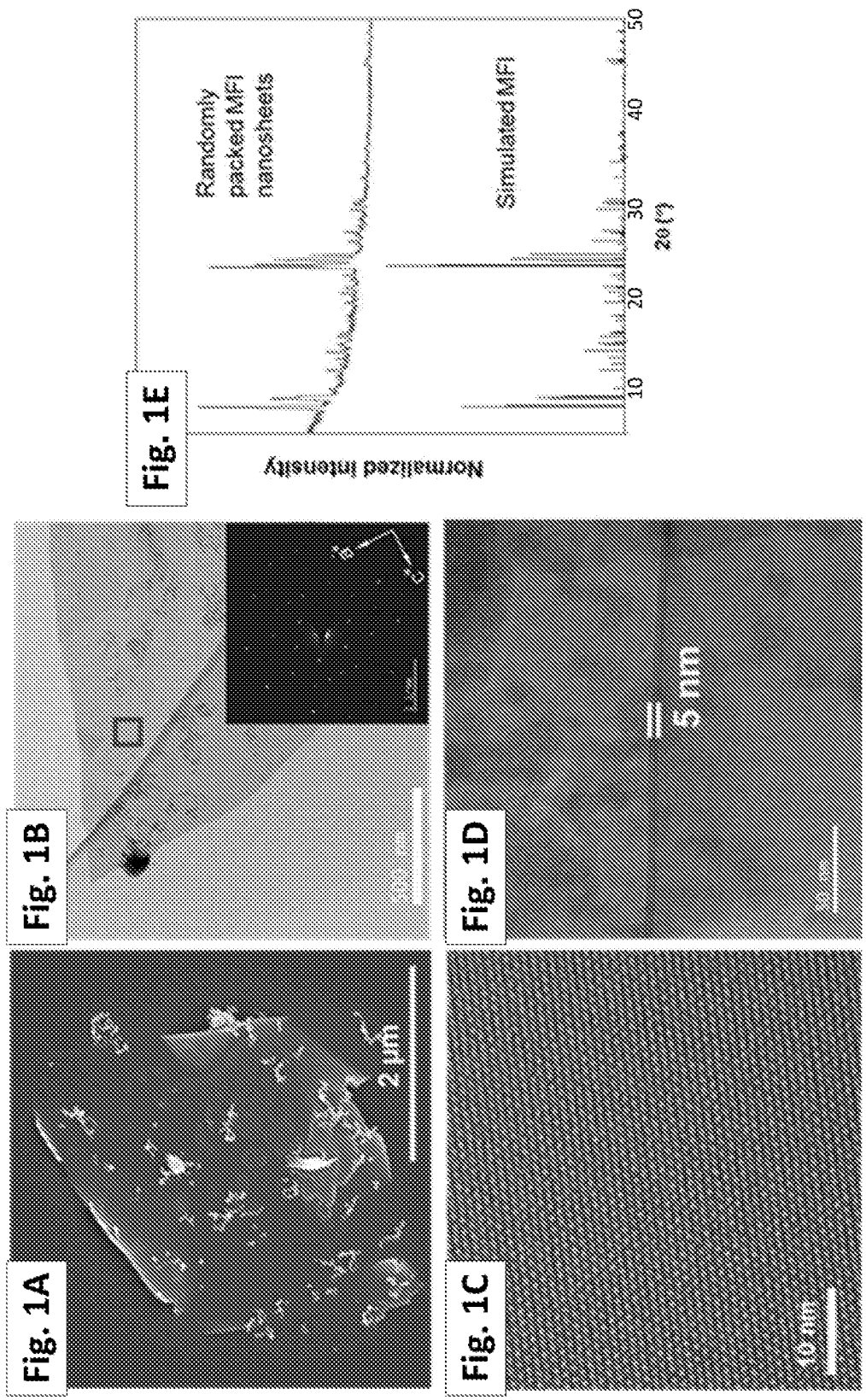

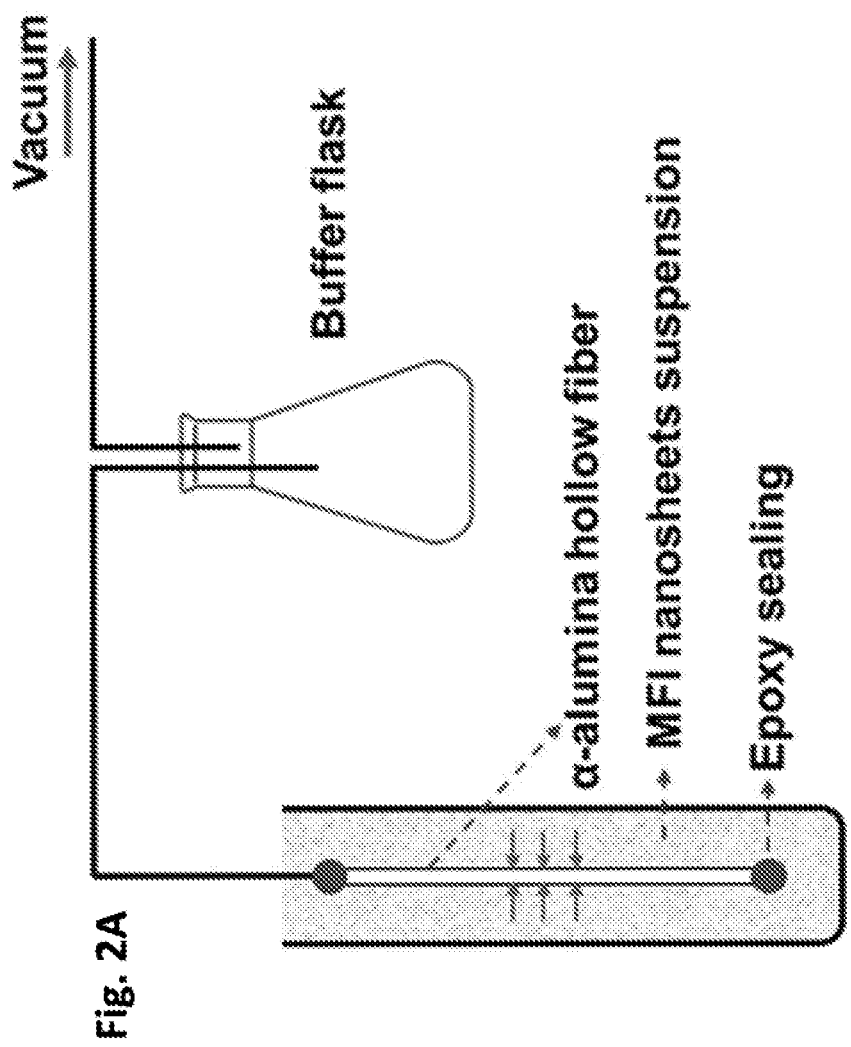

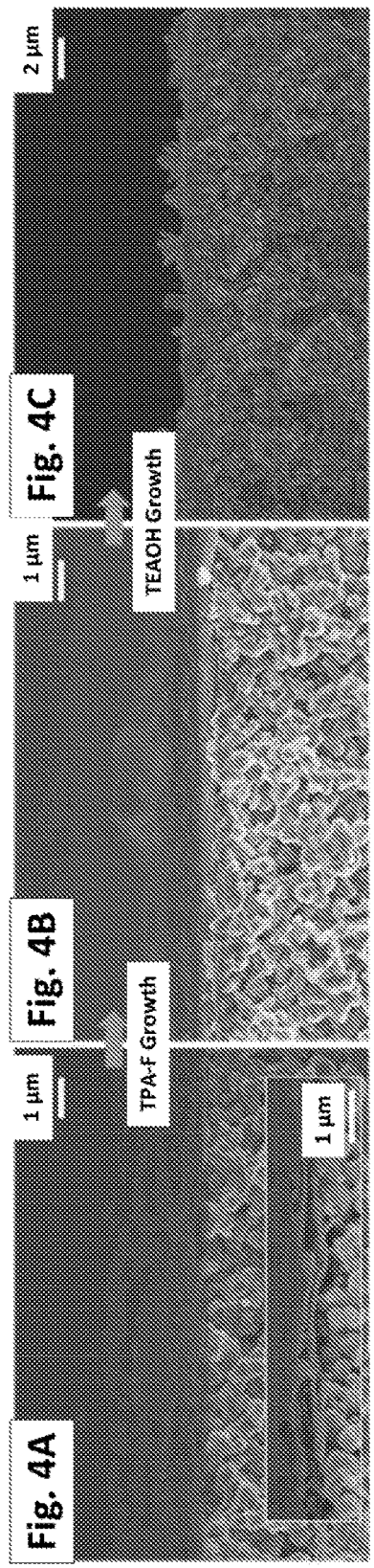
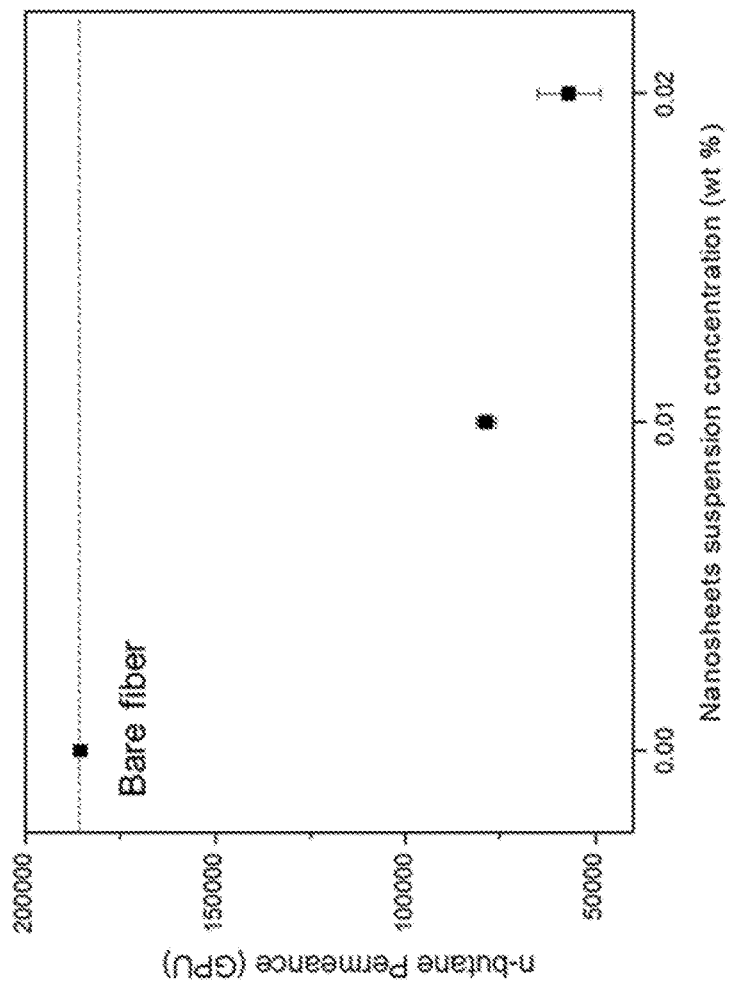

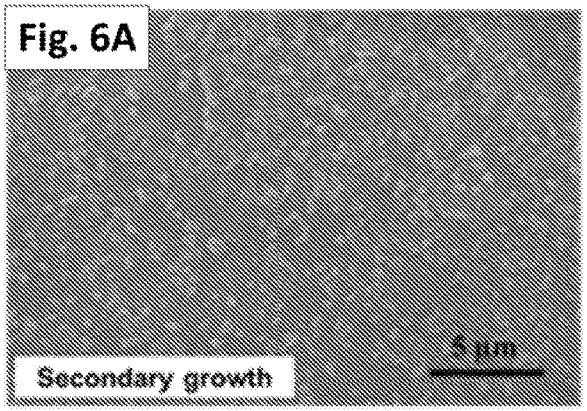
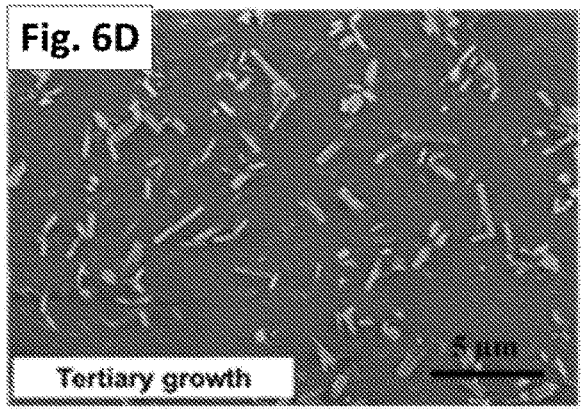
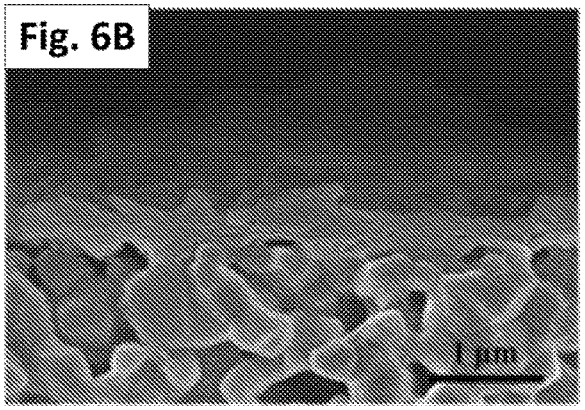
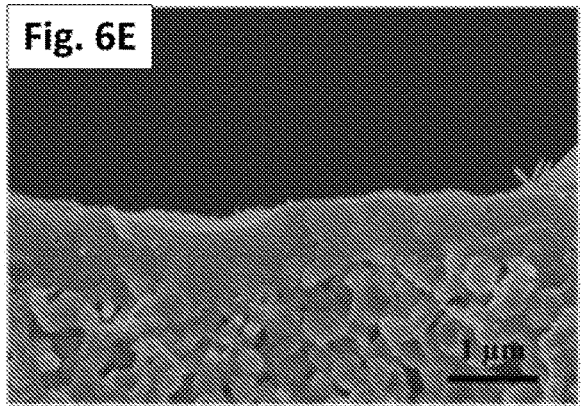
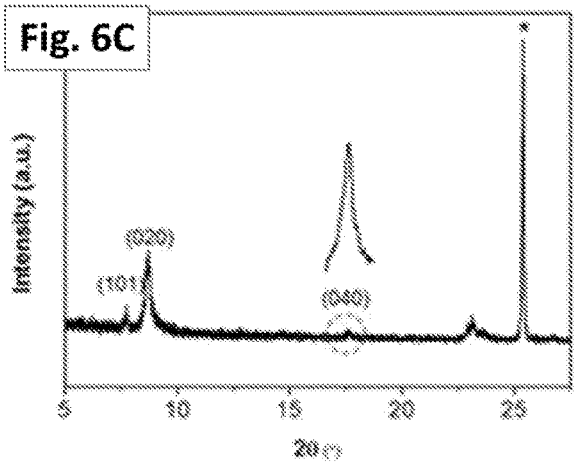
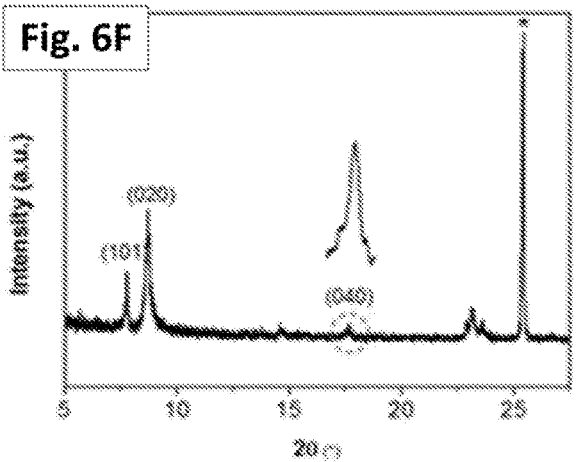

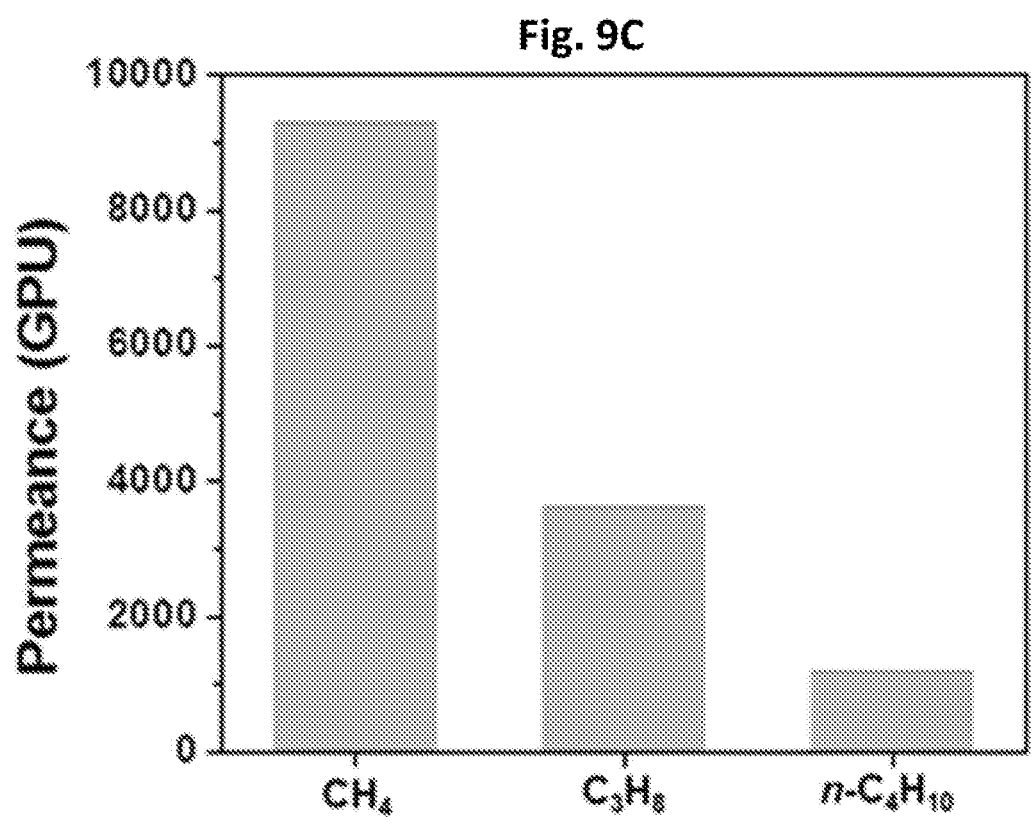

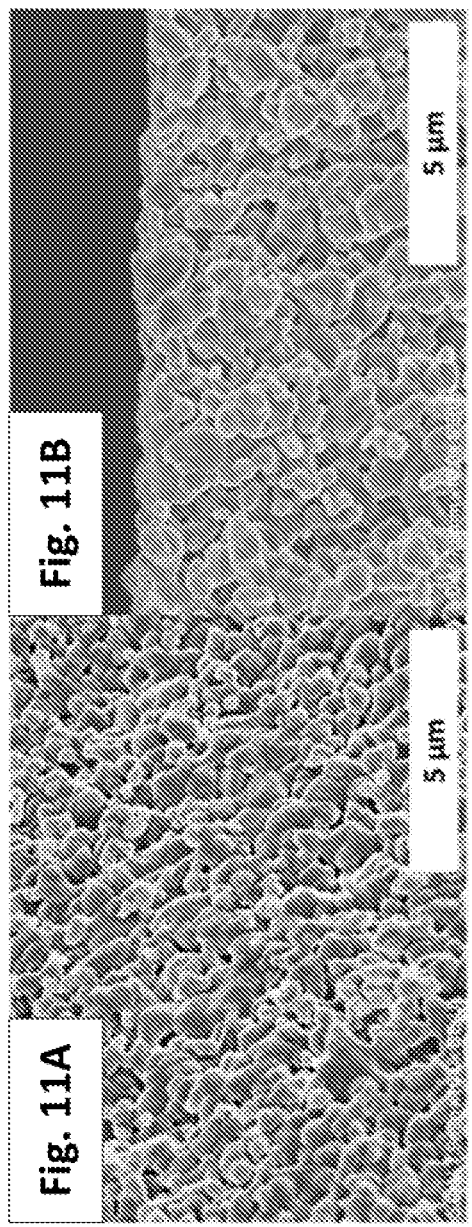
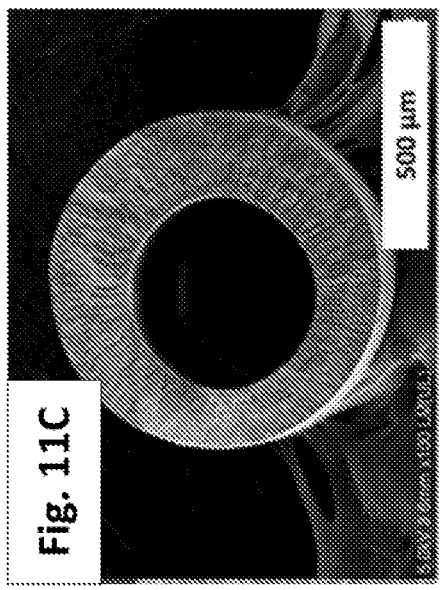

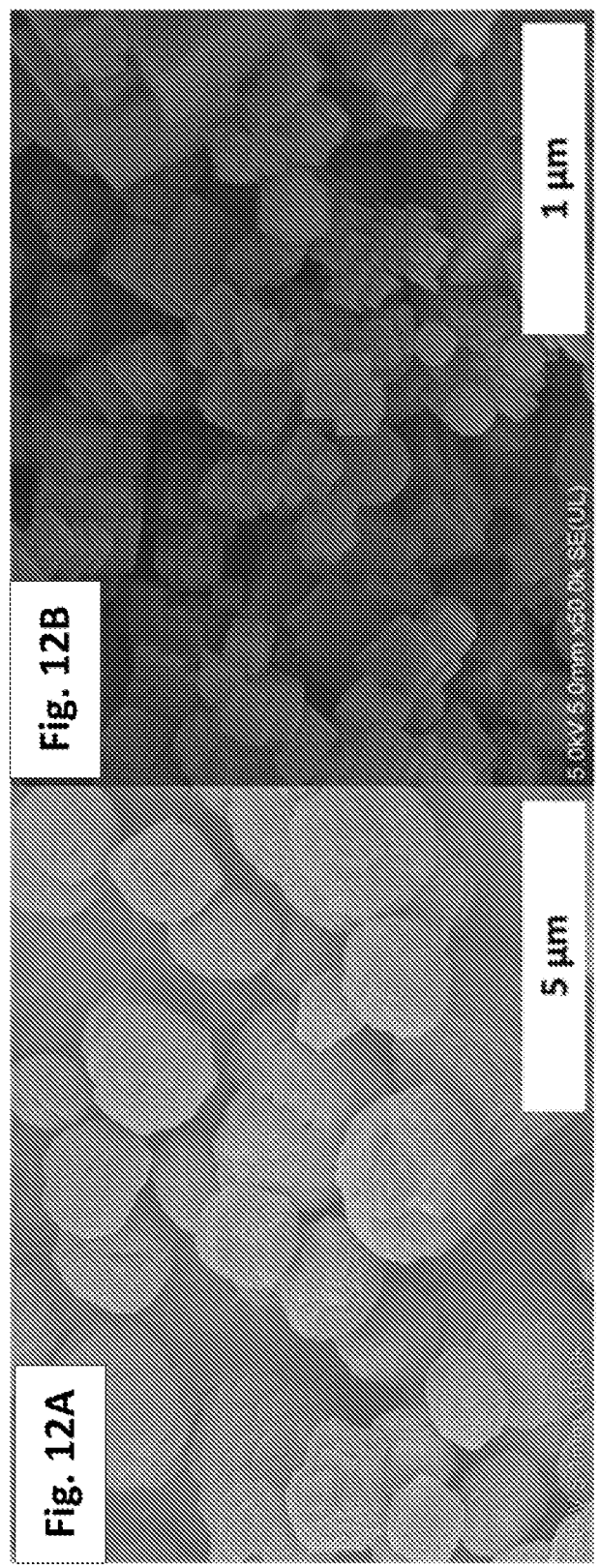

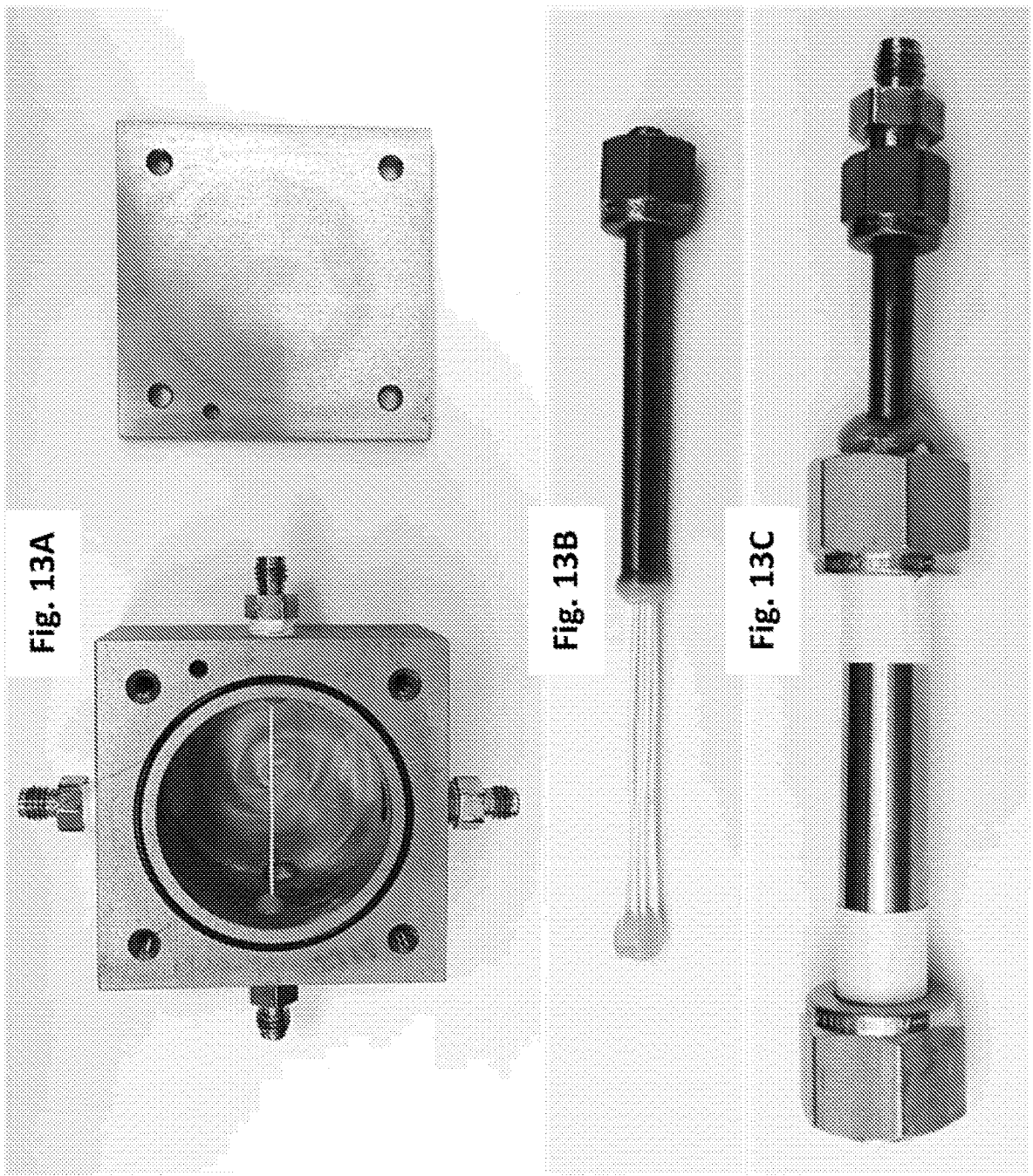

ZEOLITE MEMBRANES, MOLECULAR SEPARATION METHODS, AND MANUFACTURING PROCESSES FOR ZEOLITE MEMBRANES

CROSS-REFERENCE TO RELATED APPLICATIONS

This application claims the benefit of U.S. Provisional Application Ser. No. 62/853,434, filed on 28 May 2019, and U.S. Provisional Application Ser. No. 62/831,388, filed on 9 Apr. 2019, both of which are incorporated herein by reference in their entireties as if fully set forth below.

STATEMENT REGARDING FEDERALLY SPONSORED RESEARCH OR DEVELOPMENT

This invention was made with government support under Grant No. 1534179, awarded by the National Science Foundation, and Grant Nos. AR0000751 and NE0008298, awarded by the Department of Energy. The government has certain rights in the invention.

TECHNICAL FIELD OF THE INVENTION

The various embodiments of the present disclosure relate generally to zeolite membranes and methods of manufacturing zeolite membranes.

BACKGROUND OF THE INVENTION

Membrane-based separations have high potential for energy efficiency and cost reduction in chemical processes. Zeolites are crystalline aluminosilicates with uniform pore sizes in the sub-nanometer range, and also possess excellent thermal and chemical stability. These features make them attractive molecular sieving membrane materials. Small-pore zeolites containing 8-membered rings (8 MRs) such as CHA, DDR, LTA, and T-type (ERI/OFF intergrowth) zeolites are particularly attractive for molecular sieving of gases. CHA-type zeolites have demonstrated the best separation properties among small-pore zeolites for $CO_2/CH_4$ and $CO_2/N_2$ separation, according to a number of experimental and computational studies. Experimental demonstrations have been primarily made by growing zeolite membranes on disk or tubular substrates made of ceramic or metallic materials. High gas separation performance depends critically on the capability to control the occurrence of nanoscopic and mesoscopic membrane defects, which in turn has been typically assumed to require the use of specialty engineered supports (often multilayered) and multistep membrane growth methods. While this approach allows one to produce high-quality membrane samples on the laboratory scale, it is unfortunately not scalable/transferable for practical gas separation applications because of the high costs of engineered supports or the associated membrane fabrication processes.

Thus, the difficulty of low-cost and scalable fabrication of zeolite membranes is a key barrier to their widespread application. In the last few years, the emergence of zeolitic membranes based upon 2-dimensional (2D) zeolite nanosheets has created an opportunity to overcome this barrier. In principle, one can deposit uniform and thin (0.1-1 lm) coatings of high-aspect ratio zeolite nanosheets on nearly any kind of porous membrane substrate and then perform a final zeolite growth step to close the nanoscopic gaps between the nanosheets, thereby creating very high-flux molecular sieving membranes. For example, nanosheets (3-5 nm in thickness) of zeolite MFI have been synthesized both by exfoliation of 2D MFI layered stacks as well as by seed-assisted bottom-up methods. The MFI nanosheets produced by the latter route offer particularly attractive structural features such as a very high aspect ratio favorable for thin coatings, very short diffusion pathways through the nanosheet, high-yield production without need for an exfoliation process, and good dispersibility in water. MFI membranes fabricated from these MFI nanosheets have shown high fluxes and excellent separation of xylene isomers and also of butane isomers. Despite the excellent separation performance of the above MFI membranes, their current fabrication process faces considerable hurdles in practical feasibility and scalability. At present the fabrication process is only possible on porous Stöber silica-derived disk-type supports. It has been hypothesized that such a support provides an optimal delivery of silicate reactants to the 2D MFI nanosheet coating and facilitates its growth into a defect-free membrane, and its properties are difficult to replicate with other types of silica-containing supports. However, Stöber silica disk supports are difficult to fabricate, and their fabrication in the form of tubular or hollow fiber supports is even more challenging.

Therefore, the next key challenge is to be able to fabricate 2D MFI nanosheet-based membranes on simple and scalable macroporous supports that do not require any surface engineering and can be produced at low cost. This is a significant issue because new processes for 2D MFI nanosheet coating and MR membrane fabrication must be developed, due to the fact that silicate reactants can no longer be obtained from the underlying support. Inorganic (specifically α-alumina) hollow fiber supports are of particular interest because of their high packing density (membrane surface area/volume ratio of 1,000-10,000 m2/m3), excellent chemical and thermal stability, and good mechanical strength under ordinary processing conditions.

High-silica (Si/Al ratio>50) CHA zeolite membranes also present problems with scalable fabrication. These membranes are more hydrophobic than low-silica zeolites and their separation properties are less sensitive to the presence of water vapor in the feed gas stream. High-silica CHA zeolite (also known as SSZ-13) membranes were initially reported in 2002. Significant advances have been made in demonstrating the properties of high-silica CHA zeolite membrane since then. For example, one team successfully made high-quality SSZ-13 membranes on mullite tubes by a dual-template strategy. The best membranes had a $CO_2$ permeance of ~650 GPU (1 Gas Permeation Unit=3.348× 10-10 mol m-2 s-1 Pa-1) with a $CO_2/CH_4$ equimolar mixture separation factor of 300 at 303 K and 2 bar feed pressure. Another team developed high-silica CHA zeolite membranes on tubular alumina supports with extremely high $CO_2$ permeances of nearly 12,000 GPU and $CO_2/CH_4$ equimolar mixture separation factor of 130 at 298 K and 1 bar feed pressure. However, this required a three-step synthesis process involving rub-coating (by hand) of CHA seed crystals on the tubular substrates, followed by coating of a thick (3-5 mm) precursor paste, and then wrapping with Teflon tape before heating to 423 K to crystallize the zeolite membrane. While such demonstrations of the impressive properties of CHA membranes motivate further developments, the fabrication strategies employed above face high barriers due to their difficulty of scale-up and lack of transferability to practical fabrication processes. For example, it has been estimated that such tubular zeolite membranes could be prohibitively expensive by almost two orders of magnitude when fabricated on a large scale. Thus, an important challenge is to be able to replicate the high-performance characteristics using low-cost, mass-produced supports and simpler membrane growth techniques.

Therefore, there is a desire for improved zeolite membrane manufacturing processes that address one or more of the issues discussed above. Various embodiments of the present invention address this desire.

BRIEF SUMMARY OF THE INVENTION

The present invention relates to zeolite membranes and methods of manufacturing zeolite membranes. An exemplary embodiment of the present invention provides a method of manufacturing a zeolite membrane, comprising: providing at least one porous substrate; and coating the at least one porous substrate with a membrane.

In any of the embodiments disclosed herein, the membrane can comprise a plurality of nanosheets and the method can further comprise hydrothermally treating the membrane.

In any of the embodiments disclosed herein, hydrothermally treating the plurality of nanosheets can comprise a first hydrothermal treatment with a first substance and a second hydrothermal treatment with a second substance, wherein the second hydrothermal treatment occurs after the first hydrothermal treatment.

In any of the embodiments disclosed herein, the first substance can comprise tetrapropylammonium fluoride (TPAF).

In any of the embodiments disclosed herein, the second substance can comprise tetraethylammonium hydroxide (TEAOH).

In any of the embodiments disclosed herein, the first hydrothermal treatment can occur over a period of between about 6 hours and about 12 hours.

In any of the embodiments disclosed herein, the second hydrothermal treatment can occur over a period of between about 40 hours and about 56 hours.

In any of the embodiments disclosed herein, the at least one porous substrate can comprise at least one α-alumina porous hollow fiber.

In any of the embodiments disclosed herein, hydrothermally treating the membrane can increase adhesion of the membrane to the at least one porous substrate.

In any of the embodiments disclosed herein, hydrothermally treating the membrane can fill in at least a portion of voids located between the plurality of nanosheets.

In any of the embodiments disclosed herein, the membrane can have a thickness of less than 800 nm after the hydrothermal treatment.

In any of the embodiments disclosed herein, out-of-plane orientation of the membrane can be preserved after the hydrothermal treatment.

In any of the embodiments disclosed herein, the coating can occur via a vacuum filtration process.

In any of the embodiments disclosed herein, after the hydrothermal treatment, the membrane can have an n-butane permeance in the range of 100-10,000 gas permeation units at room temperature and with a pressure difference of 1-20 bar across the membrane.

In any of the embodiments disclosed herein, after the hydrothermal treatment, the membrane can have a separation factor for n-butane/methane in the range of 50-500 at room temperature and with a pressure difference of 1-20 bar across the membrane.

In any of the embodiments disclosed herein, after the hydrothermal treatment, the membrane can have a separation factor for propane/methane in the range of 10-100 at room temperature and with a pressure difference of 1-20 bar across the membrane.

In any of the embodiments disclosed herein, the membrane coated on the substrate can be selected from the group consisting of a chabazite (CHA)-type zeolite membrane and a (MFI)-type zeolite membrane.

In any of the embodiments disclosed herein, coating the at least one porous substrate with a membrane, can comprise coating the at least one porous substrate with a precursor gel.

In any of the embodiments disclosed herein, the method can be performed without coating the at least one porous substrate with a plurality of nanosheets.

In any of the embodiments disclosed herein, the precursor gel can comprise a continuous gel phase and CHA crystals and/or MFI crystals.

In any of the embodiments disclosed herein, the precursor gel can comprise silicon dioxide ($SiO_2$) and water ($H_2O$) in a $SiO_2$:$H_2O$ ratio of about 5:1 to about 10:1.

In any of the embodiments disclosed herein, the precursor gel can comprises silicon dioxide ($SiO_2$) and water ($H_2O$) in a $SiO_2/H_2O$ ratio of about 5:1.

In any of the embodiments disclosed herein, the precursor gel can be manufactured by a process comprising: combining sodium hydroxide, a trimethyladamantylammonium hydroxide (TMAdaOH) solution in water, and aluminum hydroxide while stirring to form a first mixture; adding CHA crystals to the first mixture; and evaporating at least a portion of the water in the first mixture in a silicone oil bath.

In any of the embodiments disclosed herein, the precursor gel can comprise silicon dioxide ($SiO_2$), sodium oxide ($Na_2O$), aluminum oxide ($Al_2O_3$), and trimethyladamantylammonium hydroxide (TMAdaOH) present in a molar composition of about 1.0 $SiO_2$:0.1 $Na_2O$:0.005 $Al_2O_3$:0.4 TMAdaOH.

In any of the embodiments disclosed herein, coating the at least one porous substrate with a precursor gel comprises: surrounding at least a portion of the at least one porous substrate with the precursor gel; heating the at least one porous substrate and the precursor gel; washing the at least one porous substrate; drying the at least one porous substrate; and calcining the at least one porous substrate.

In any of the embodiments disclosed herein, the heating can occur at a temperature of between about 400K and about 500K.

In any of the embodiments disclosed herein the heating can occur for a time period of between about 6 hours and about 24 hours.

In any of the embodiments disclosed herein, the membrane can have carbon dioxide ($CO_2$) permeance in the range of 1,000-20,000 gas permeation units under feed conditions at 0-100% humidity.

In any of the embodiments disclosed herein, the membrane can have a separation factor for carbon dioxide-methane in the range of 50-500 in a 1-7 bar feed pressure range.

In any of the embodiments disclosed herein, the membrane can have a separation factor for carbon dioxide/propane in the range of 100-2,000 in a 1-7 bar feed pressure range.

In any of the embodiments disclosed herein, the at least one porous substrate can comprise at least one porous hollow fiber.

In any of the embodiments disclosed herein, the at least one porous substrate can comprise a plurality of porous hollow fibers.

In any of the embodiments disclosed herein, the at least one porous substrate can comprise a plurality of porous substrates.

Another embodiment provides a zeolite membrane. The zeolite membrane can be manufactured by any of the methods disclosed herein.

These and other aspects of the present invention are described in the Detailed Description of the invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

FIG. 1A provides an SEM image of an individual MFI nanosheet, FIG. 1B provides a TEM image of a top view of a single MFI nanosheet (ac plane) along with a electron diffraction patterns (inset) from the out-lined area, FIG. 1C provides an HRTEM image of the nanosheet showing the MFI pore channels in the b-direction, FIG. 1D provides a TEM image of the edge of a single nanosheet measuring approximately 5 nm in thickness, and FIG. 1E provides powder XRD patter of a randomly packed MFI nanosheets and comparison with the simulated MFI powder pattern, in accordance with an exemplary embodiment of the present invention.

FIG. 2A provides a schematic diagram of a vacuum filtration set-up, FIG. 2B provides an image of a hollow fiber and a disk-type support, and FIG. 2C provides an image of a hollow fiber membrane mounted in a module for permeation measurements, in accordance with an exemplary embodiment of the present invention.

FIG. 4A provides an SEM image of a cross-sectional image of a nanosheet coating, FIG. 4B provides an SEM image after TPA-F secondary growth of the membrane, and FIG. 4C provides an SEM image after TEAOH tertiary growth of the membrane, in accordance with an exemplary embodiment of the present invention.

FIG. 5 provides a plot of room temperature n-butane single gas permeance (dead-end mode) of a bare hollow fiber and a nanosheet coating at two different concentrations of the suspension, in which one gas permeation unit (GPU) equals $3.348 \times 10^{-10}$ mol·m$^{-2}$s$^{-1}$ Pa$^{-1}$, in accordance with an exemplary embodiment of the present invention.

FIG. 6A provides an SEM image of a top-view of an MFI membrane after 12 hours of secondary growth, FIG. 6B provides an SEM image of a cross-sectional view of an MFI membrane after 12 hours of secondary growth, FIG. 6C provides an XRD pattern of an MFI membrane after 12 hours of secondary growth, FIG. 6D provides an SEM image of a top-view of an MFI membrane after tertiary growth, FIG. 6E provides an SEM image of a cross-sectional view of an MFI membrane after tertiary growth, and FIG. 6F provides an XRD pattern of an MFI membrane after tertiary growth, accordance with an exemplary embodiment of the present invention.

FIGS. 9A-9C provide plots of separation performance of an MFI membrane for hydrocarbon separation, in which data and error bars are based upon averaging of membrane samples TT-4, TT-5, and TT-6 in Table 1. FIG. 9A provides n-butane/methane binary separation performance as a function of n-butane content in the methane stream, FIG. 9B provides propane/methane binary separation performance as a function pf propane content in the methane stream, and FIG. 9C provides single-component permeation data for each component in membrane TT-4, in accordance with an exemplary embodiment of the present invention.

FIG. 11A provides an SEM image of a surface of an alumina hollow fiber substrate, FIG. 11B provides an SEM image of a partial cross-section of an alumina hollow fiber substrate, and FIG. 11C provides a low-magnification SEM image of a hollow fiber substrate showing full cross-section, in accordance with an exemplary embodiment of the present invention.

FIG. 12A provides an SEM image of SSZ-13 microcrystals, and FIG. 12B provides an SEM image of submicron SSZ-13 crystals prepared using microcrystals as seeds, in accordance with an exemplary embodiment of the present invention.

FIG. 13A provides an image of a flow-through single-fiber module scaled by epoxy, FIG. 13B provides an image of an initial assembly of 20 fibers to a ¼ inch tube sealed by epoxy, and FIG. 13C provides an image of an overall dead-ended 20-fiber module by sealing a ¼ inch tube in a ½ inch tube with expoxy, in accordance with exemplary embodiments of the present invention.

DETAILED DESCRIPTION OF THE INVENTION

Figure 3A:
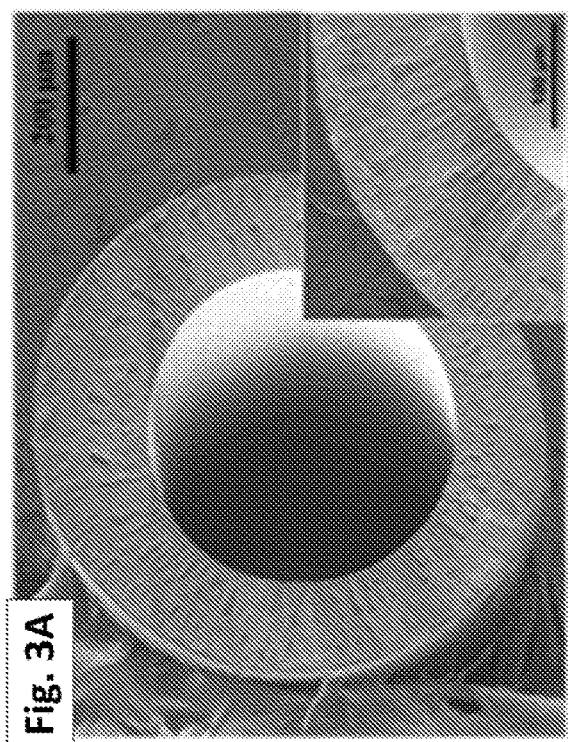
FIG. 3A provides an SEM image of an α-alumina hollow fiber with (inset) an enlarged cross-section, FIG. 3B provides an SEM image of a top-view of the hollow fiber, FIG. 3C provides an SEM image of a cross-sectional view of an MFI nanosheet coating on a hollow fiber along with (inset) the bare fiber morphology, and FIG. 3D provides XRD pattern of the nanosheets coating showing (0k0) out-of-plane orientation, in accordance with an exemplary embodiment of the present invention.

To facilitate an understanding of the principles and features of the present invention, various illustrative embodiments are explained below. To simplify and clarify explanation, the invention is described below as applied to membranes for gas separation. One skilled in the art will recognize, however, that the invention is not so limited. Instead, as those skilled in the art would understand, the various embodiments of the present invention also find application in other areas, including, but not limited to, solid and liquid separation.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

Various embodiments disclosed provide methods of manufacturing a zeolite membrane. The methods can comprise providing at least one porous hollow fiber and coating the at least one porous hollow fiber (or other porous substrate) with a membrane.

The porous hollow fiber can be many different porous hollow fibers or other porous substrates. Additionally, various embodiments can employ many different numbers of hollow porous fibers or other porous substrates. For example, in some embodiments, a single porous hollow fiber is used. In some embodiments a high number of porous hollow fibers are used, e.g., 10 or more, 20 or more, 50 or more, 100 or more. In some embodiments, the porous hollow fiber can be a ceramic porous hollow fiber. In some embodiments, the porous hollow fiber can be an α-alumina hollow porous fiber.

In some embodiments, the membrane coating the fiber comprises a plurality of nanosheets. Defects or voids can be present between adjacent nanosheets, which can jeopardize efficiency of the membrane. For example, the voids/defects can prevent certain substances, e.g., butane, from being separated from a feed because molecules of those substances can freely diffuse through the voids between nanosheets. Thus, additional surface treatments can be employed to render the membrane capable of molecular sieving. Particularly, the voids can be closed by growth of MFI domains, driven by supply of silicate reactants from an underlying Stöber silica derived disk support.

Conventional hydrothermal treatments with tetrapropylammonium or tetraethylammonium hydroxid (TPAOH or TEAOH), however, are insufficient. In the case of TPAOH, the MFI nanosheet coating quickly loses its (0k0) orientation due to abundant twinning and secondary nucleation, as has also been shown for MFI membranes grown from (0k0)-oriented exfoliated nanosheets and seed particles. This surface roughening can be explained by the mechanism of the MFI growth in TPAOH conditions, in which aggregated precursor nanoparticles evolve into MFI particles. This could be potentially avoided by the use of TEAOH, which is known to delay nucleation and suppress surface roughening. Moreover, the in-plane growth rate is known to be considerably faster than the out-of-plane growth rate, thus, promoting the formation of highly intergrown thin films. Indeed, after TEAOH-based hydrothermal growth, the 23D MFI nanosheets were seemingly laterally well-intergrown but with some mis-oriented crystals. However, the membranes were prone to estyendisve cracks and delamination from the alumina fiber support surface, which can be attributed to insufficient adhesion of the MFI film to the alumina support as a result of slow out-of-plane growth.

To overcome certain disadvantages with these conventional treatments, some embodiments further comprise hydrothermally treating the membrane. In some embodiments, hydrothermally treating the membrane comprises a first hydrothermal treatment with a first substance. In some embodiments, hydrothermally treating the membrane further comprises a second hydrothermal treatment with a second substance after the first hydrothermal treatment. The first and second substances can be many different substances. The first hydrothermal treatment can fill in larger defects/voids between the nanosheets, and the second hydrothermal treatment can fill in smaller defects/voids between the nanosheets. In some embodiments, the first substance comprises tetrapropylammonium fluoride (TPAF). In some embodiments, the second substance comprises tetraethylammonium hydroxide (TEAOH). The fluoride-medium synthesis generally yields MFI crystals with smooth and large grains. Furthermore, addition of fluoride ions alters the relative rates of in-plane and out-of-plane growth. As will be discussed in the examples below, testing shows that TPAF-based hydrothermal treatment can be effective for selective void sealing between 2D MF nanosheets while maintaining a desirable out-of-plane orientation and good adhesion with the alumina support surface, without the need for specially engineered support surfaces.

The first hydrothermal treatment can occur over varying time periods. In some embodiments, the first hydrothermal treatment occurs over at least 1 hour, at least 3 hours, at least 6 hours, at least 9 hours, at least 12 hours, at least 18 hours, at least 24 hours, at least 36 hours, or at least 48 hours. Additionally, the first hydrothermal treatment occurs in no more than 6 hours, no more than 12 hours, no more than 18 hours, no more than 24 hours, no more than 36 hours, no more than 48 hours, or no more than 72 hours. In an exemplary embodiment, the first hydrothermal treatment occurs over a period of 6 to 48 hours. In some embodiments, the first hydrothermal treatment occurs over a period of 6 to 12 hours. The shorter duration can selectively fill voids without significant overgrowth and also without delamination or crack formation. Longer growth durations, however, can lead to considerable overgrowth of a polycrystalline MFI layer on the nanosheets, which may not preserver the (0k0) out-of-plane orientation of the membrane.

The first hydrothermal treatment can occur at many different temperatures. In some embodiments, the first hydrothermal treatment can occur at at least 273K, at least 323K, at least 353K, at least 373K, or at least 393K. Additionally, in some embodiments, the first hydrothermal treatment can occur at no more than 373K, no more than 393K, no more than 423K, no more than 453K, or no more than 473K. In some embodiments, the first hydrothermal treatment occurs between 353K and 393K, particularly at about 373K.

Though the first hydrothermal treatment step is useful for selective void sealing between nanosheets, a second hydrothermal treatment step can be used to fill non-selective nanoscopic gaps. To selectively close the nanoscopic small gaps while continuing to preserve the desired orientation, the membrane can be subjected to a second hydrothermal treatment with a TEAOH-containing silica The second hydrothermal treatment can occur over varying time periods. In some embodiments, the second hydrothermal treatment occurs over at least 12 hours, at least 18 hours, at least 24 hours, at least 36 hours, at least 48 hours, at least 60 hours, at least 72 hours, at least 84 hours, or at least 96 hours. Additionally, the second hydrothermal treatment occurs in no more than 18 hours, no more than 30 hours, no more than 42 hours, no more than 56 hours, no more than 68 hours, no more than 70 hours, or no more than 82 hours. In an exemplary embodiment, the first hydrothermal treatment occurs over a period of 40 to 56 hours, particularly about 48 hours.

The second hydrothermal treatment can occur at many different temperatures. In some embodiments, the second hydrothermal treatment can occur at at least 273K, at least 323K, at least 353K, at least 373K, at least 393K, at least 413K, at least 433K, or at least 443K. Additionally, in some embodiments, the second hydrothermal treatment can occur at no more than 373K, no more than 393K, no more than 413K, no more than 433K, no more than 453K, no more than 473K, or no more than 493K. In some embodiments, the second hydrothermal treatment occurs between 433K and 453K, particularly at about 443K.

In some embodiments, after hydrothermal treatment, the membrane maintains a low thickness. For example, in some embodiments, after hydrothermal treatment, the membrane maintains a thickness of less than 1000 nm, less than 900 nm, less than 800 nm, less than 700 nm, or less than 600 nm.

In some embodiments, out-of-plane orientation of the membrane is preserved after the hydrothermal treatment as determined based on an analysis of diffraction peaks in the XRD pattern after the first hydrothermal treatment step.

In some embodiments, the membrane provides an n-butane permeance in the range of 100-100,000 gas permeation units at room temperature and pressure difference of 1-20 bar across the membrane.

In some embodiments, the membrane provides a separation factor for n-butane/methane in the range of 50-500 at room temperature and a pressure difference of 1-20 bar across the membrane.

In some embodiments, the membrane provides a separation factor for propane/methane in the range of 10-100 at room temperature and a pressure difference of 1-20 bar across the membrane.

Some embodiments of the present invention provide a method of manufacturing a membrane using a single step direct gel conversion method. The membranes can be either CHA-type or MFI-type zeolite membranes.

In some embodiments, the coating step disclosed above can comprise coating the at least one porous substrate (or hollow porous fiber) with a precursor gel. These embodiments, however, do not require coating the substrate with a plurality of nanosheets as disclosed above. The precursor gel can comprise a continuous gel phase and a plurality of crystals. The crystals can be CHA (for a CHA membrane) or MFI (for an MFI membrane).

The precursor gel can comprise silicon dioxide ($SiO_2$) and water ($H_2O$). The ratio of $SiO_2$ to $H_2O$ can be from about 1:1 to about 20:1. In some embodiments, ratio of $SiO_2$ to $H_2O$ can be from 1:1 to 15:1. In some embodiments, ratio of $SiO_2$ to $H_2O$ can be from about 1:1 to 15:1. In some embodiments, ratio of $SiO_2$ to $H_2O$ can be from about 1:1 to 15:1. In some embodiments, ratio of $SiO_2$ to $H_2O$ can be from about 1:1 to 15:1. In some embodiments, ratio of $SiO_2$ to $H_2O$ can be from about 5:1 to 15:1. In some embodiments, ratio of $SiO_2$ to $H_2O$ can be from about 5:1 to 10:1. In some embodiments, ratio of $SiO_2$ to $H_2O$ can be from about 1:1 to 10:1. In some embodiments, ratio of $SiO_2$ to $H_2O$ can be from about 1:1 to 5:1. In some embodiments, ratio of $SiO_2$ to $H_2O$ can be from about 5:1 to 20:1. In some embodiments, ratio of $SiO_2$ to $H_2O$ can be from about 10:1 to 20:1. In some embodiments, ratio of $SiO_2$ to $H_2O$ can be from about 10:1 to 15:1.

The precursor gel can be manufactured by many different processes. In an exemplary embodiment, the precursor gel is manufactured by a process comprising: creating a first mixture; adding CHA or MFI crystals to the first mixture; and evaporating at least a portion of the water in the first mixture. In some embodiments, the evaporation can occur in a silicone oil bath. The first mixture can be created by combining sodium hydroxide, a trimethyladamantylammonium hydroxide (TMAdaOH) solution in water, and aluminum hydroxide while stirring.

In some embodiments, the precursor gel comprises silicon dioxide ($SiO_2$), sodium oxide ($Na_2O$), aluminum oxide ($Al_2O_3$), and trimethyladamantylammonium hydroxide (TMAdaOH). In some embodiments, the components are present in a molar composition of about 1.0 $SiO_2$:0.1 $Na_2O$: 0.005 $Al_2O_3$:0.4 TMAdaOH.

In some embodiments, coating the at least one porous substrate with a precursor gel comprises: surrounding at least a portion of the at least one porous substrate with the precursor gel; heating the at least one porous substrate and the precursor gel; washing the at least one porous substrate; drying the at least one porous substrate: and calcining the at least one porous substrate.

The heating can occur at many different temperatures. In some embodiments, the heating can occur at a temperature between about 273K and about 573K. In some embodiments, the temperature is greater than 273K, greater than 293 K, greater than 313K, greater than 333K, greater than 353K, greater than 373K, greater than 393K, greater than 413K, greater than 433K, or greater than 453K. In some embodiments, the heating occurs at less than 573K, less than 553K, less than 533K, less than 513K, less than 493K, less than 473K, less than 453K, less than 433K, less than 413K, or less than 393K.

The heating can also occur for many different durations in accordance with various embodiments. In some embodiments, the heating can occur over a time period of between 1 and 72 hours. In some embodiments, the heating occurs for at least 1 hour, at least 3 hours, at least 6 hours, at least 9 hours, at least 12 hours, at least 18 hours, at least 24 hours, at least 36 hours, at least 48 hours, or at least 60 hours. In some embodiments, the heating occurs for less than 72 hours, less than 60 hours, less than 48 hours, less than 36 hours, less than 24 hours, less than 18 hours, less than 12 hours, less than 9 hours, or less than 6 hours. In some embodiments, the heating occurs for a time period of between about 6 hours and about 24 hours.

Both the water content of the precursor gel and the synthesis time (heating duration) can affect the permeance of the resulting membrane. For example, longer heating durations can result in greater thickness of the membrane and lower permeance. The table below provides examples of how gel concentration and synthesis duration can affect permeance and selectivity.

| $SiO_2:H_2O$ molar ratio in gel | Synthesis Duration (hours) | $CO_2$ Permeance (GPU) | Ideal Selectivities | | | |
|---|---|---|---|---|---|---|
| | | | $CO_2/N_2$ | $CO_2/CH_4$ | $CO_2/C_3H_8$ | $N_2/CH_4$ |
| 10 | 24 | 3300 ± 400 | 10 ± 3 | 52 ± 15 | 280 ± 270 | 6 ± 3 |
| 5 | 6 | 11000 ± 2000 | 9 ± 1 | 32 ± 20 | 63 ± 64 | 4 ± 2 |
| 5 | 12 | 4500 ± 1000 | 12 ± 1 | 120 ± 18 | 1300 ± 750 | 11 ± 2 |

The resulting membrane can comprise a thin zeolite top layer as well as a considerable non-continuous growth of zeolite crystals in the pores of the porous substrate. In some embodiments, the top layer has a thickness of about 0.6-1.8 μm.

The membranes produced show desirable selectivity and permeances. In some embodiments, the membrane has carbon dioxide ($CO_2$) permeance in the range of 1,000-20,000 gas permeation units under feed conditions at 0-100% humidity (i.e., dry or wet conditions). In some embodiments, the membrane has a separation factor for carbon dioxide/methane in the range of 50-500 in a 1-7 bar feed pressure range. In some embodiments, the membrane has a separation factor for carbon dioxide/propane in the range of 100-2,000 in a 1-7 bar feed pressure range.

EXAMPLES

Example 1: Two-Step Hydrothermal Treatment

Materials

For MFI nanosheet crystal and membrane preparation, Tetraethyl orthosilicate, tetraethylammonium hydroxide solution (35%), hydrofluoric acid (40-45%), potassium chloride and LUDOX SM-30 colloidal silica (30%) were purchased from Sigma-Aldrich. Potassium hydroxide was purchased from Merck. Sulfuric acid (95-97%) and tetrapropylammonium hydroxide solution (40%) were purchased from EMD Millipore.

Preparation of α-Alumina Hollow Fibers

The preparation of α-alumina hollow fibers employed Baikalox CR6 with average particle size of 500 nm as the alumina powder source and a sintering temperature of 873 K. The spinning dope suspension had a composition (wt. %) of 38.0 NMP:6.8 PES:54.7 $Al_2O_3$:0.5 PVP. Hollow fiber spinning was conducted with an apparatus constructed in-house. Dope and bore fluid flow rates of 120 and 80 mL/h respectively were used. Deionized (DI) water and tap water were used as the bore fluid and external coagulant fluids respectively. Both the dope and water bath were at room temperature. The air gap was 3 cm. The fibers fell freely into the water bath bucket and were collected, soaked in DI water for 3 days (with the water changed daily) to exchange the residual solvent, and thoroughly dried. The raw/"green" fibers were then sintered at 873 K for 2 h followed by 6 h at 1673 K with a temperature ramping rate of 5 K/min. The finished fibers were of 750 Pin OD, 150 μm wall thickness, 46% porosity, and 259 nm average limiting pore size and 835 nm finger-like internal voids as obtained from mercury porosimetry. Their $N_2$ permeance at 298 K was 200,000 GPU.

Preparation of 2D MFI Nanosheet Suspension

MFI nanosheets were synthesized by bottom-up synthesis as reported by previous authors, with minor modifications. Firstly, bis-1,5(tripropyl ammonium) pentamethylene diiodide (dC5) and MFI seed nanocrystals were synthesized. MFI nanosheets were synthesized with the precursor sol composition of 80 TEAS:3.75 dC5:20 KOH:9500 $H_2O$: 5 $H_2SO_4$. The precursor sol was hydrolyzed at room temperature for 16 h and filtered through a 0.45 μm syringe filter. The filtered precursor sol was then mixed with the as-prepared MFI seed nanocrystals with the silica content in the seed suspension and the gel being in a 1:200 molar ratio. Then, the mixture was poured into a Teflon-lined stainless-steel autoclave and subjected to hydrothermal treatment at 413 K for 7 days. The as-synthesized products typically contain 2D MEI nanosheets with negligible amounts of an amorphous phase. Typically, 2.5 g of as-obtained product was mixed with 2.5 g of an alkaline salt solution (0.1 M KOH+2 M KCl) and stirred at 600 rpm. After stirring for 8 h, it was diluted with 15 mL of $H_2O$ and then centrifugated at 8500 rpm for 5 min. After decantation of the supernatant, the recovered sediment was re-dispersed in $H_2O$. The above procedure was repeated 3 times. Finally, the MFI nanosheet sediment was dispersed in $H_2O$ with the concentration of 0.01 wt. % or 0.02 wt. %.

FIG. 1A provides and SEM image of a fabricated individual MFI nanosheet. Small amounts of aggregated amorphous particles are also typically seen. FIG. 1B provides a TEM image showing top view of a single MFI nanosheet (ac plane), along with electron diffraction patterns (inset) from the outlined area. FIG. 1C provides HRTEM image of the nanosheet showing the MFI pore channels in the b-direction. FIG. 1D provides a TEM image of the edge of a single nanosheet measuring approximately 5 nm in thickness. FIG. 1E illustrates powder XRD pattern of the randomly packed MFI nanosheets and comparison with the simulated MFI powder pattern.

Nanosheet Coating on Alumina Hollow Fibers

The MFI nanosheet suspension was sonicated several times (I min each time) to ensure complete dispersion. Nanosheet coatings were made on hollow fibers by a vacuum filtration process as shown in FIGS. 2A-C. FIG. 2A provides a schematic diagram of the vacuum filtration setup. FIG. 2B provides a photograph of a hollow fiber and a disk-type support. FIG. 2C provides a photograph of a hollow fiber membrane mounted in a module for permeation measurements. One tip of the fiber was sealed by epoxy (3M-DP 100) to prevent infiltration of liquid, and the other tip was connected to a PTFE tube by epoxy. The other tip of the homemade tube was connected to vacuum pump through a Swagelok fitting. The alumina hollow fiber was immersed into the MFI nanosheet suspension under bore-side vacuum for the desired time (typically 30 s) in order to deposit the nanosheet coating on the outer surface ("shell side"). Then the fibers were dried under vacuum for 5 min, followed by calcination (353 K for 6 h and 823 K for 4 h, with ramping rate of 2 K/min).

Figure 3B:
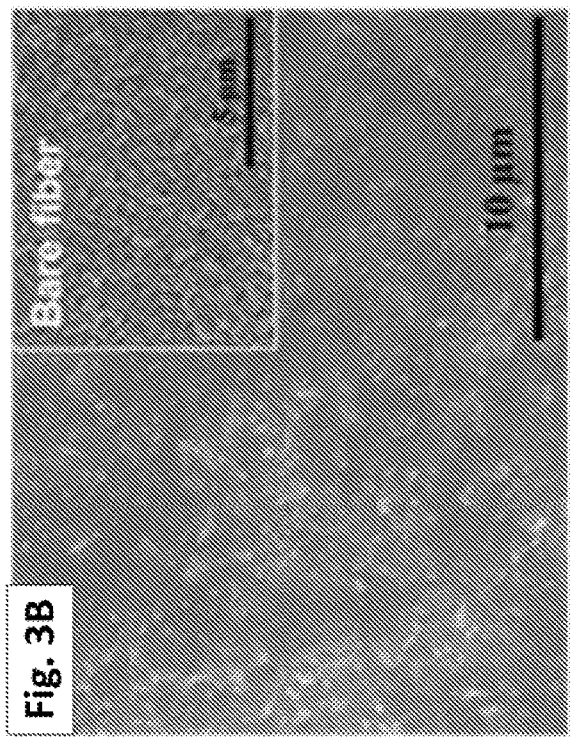
Figure 3C:
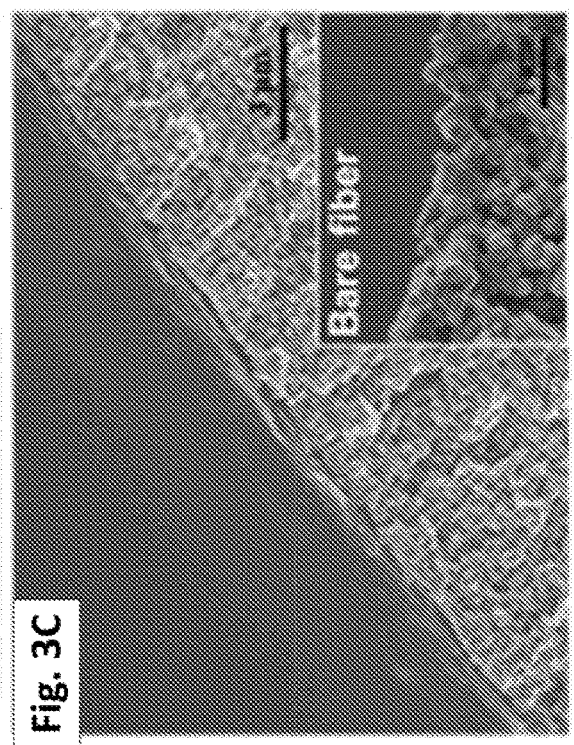
Figure 3D:
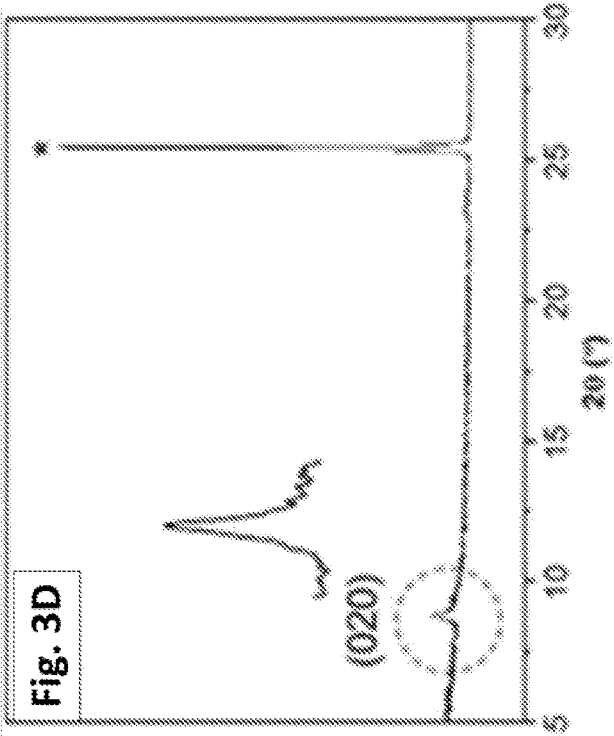

The bottom-up synthesis resulted in MFI nanosheets of large lateral dimension (~2 µm) and much smaller thickness (~5 µm), with straight pore channels of 0.56 nm×0.54 nm running through the sheet in the [010] crystallographic direction. XRD confirms the synthesis of an MFI-type material. FIG. 3A provides an image of a section of the bare α-alumina hollow fiber. After application of vacuum filtration with a 0.01 wt. % nanosheet suspension for 30 s, a continuous coating of the 2D MFI nanosheets is obtained on the outer surface of the hollow fiber, as shown in FIG. 3B (top-view) and FIG. 3C (cross-sectional view). The thickness of the coating is <500 nm, and no defects (such as cracks, delaminated areas, or uncovered areas) were found. The lamellar stacking of the nanosheets can be clearly observed from magnified SEM cross-section images as shown in FIG. 4A (cross-sectional image of the nanosheet coating), FIG. 4B ((TPA-F) secondary growth membrane, and FIG. 4C ((TEAOH) tertiary growth membrane. The XRD pattern of the coating (shown in FIG. 3D) has one prominent diffraction peak at ~8.8° 2θ, which corresponds to (020) out-of-plane orientation. This orientation is advantageous for fast diffusion of molecules to the plane of the membrane. The single-gas permeance of n-butane at room temperature decreased sharply from ~186,000 GPU (bare fiber to ~79,000 GPU after nanosheet coating from the 0.01 wt % suspension, and was further reduced to ~57,000 GPU after coating from the 0.02 wt % suspension, thus indicating that the coating thickness is adjustable by varying the MFI nanosheet concentration in the suspension as shown in FIG. 5.

Hydrothermal Growth of 2D MFI Nanosheet Coatings

The calcined MFI nanosheet coatings on the hollow fibers were treated by two sequential hydrothermal growths. In the fluoride-medium "secondary growth," a sol with a 1 $SiO_2$: 0.02 $Na_2O$:0.12 TPAOH:0.12 HF:60 $H_2O$ molar composition was hydrolyzed for 16 h ($Na_2O$ content is from LUDOX SM-30 colloidal silica source). The MFI nanosheet coated fibers were then immersed in the sol and treated hydrothermally in an autoclave at 373 K for 12 h. These initial membranes were rinsed with a 0.2 M ammonia solution and dried at 353 K overnight. To evaluate the membrane properties at this stage, calcination was carried out at 753 K for 4 h with a ramping rate of 0.5 K/min before permeation measurements. However, uncalcined membranes were used for the subsequent "tertiary growth." A sol with molar composition 1 TEOS:0.3 TEAOH:100 $H_2O$ was hydrolyzed for 16 h and the membranes were treated hydrothermally in this sol at 443 K for 48 h. After this step, the final membranes were rinsed, dried, and calcined as above.

The microstructure of the membrane after 12 h of secondary growth was examined in more detail. The SEM images in FIGS. 6A-B confirm the selective filling of voids between 2D MFI nanosheets and the suppression of overgrowth. The membrane thickness was preserved as ~500 nm. The XRD patter (shown in FIG. 6C) confirmed intense peaks from (0k0) reflections, which indicates that the out-of-plane orientation is preserved and only a small number of (h0l)-oriented grains are present. The integrated peak intensity ratio ($I_{(101)}/I_{(020)}$) was 0.11, which is much lower than the corresponding values of 0.52 for a membrane grown in TPAOH medium and 1.42 for a randomly oriented calcined MFI powder. Also, the enlarged insert shows the distinct (040) peak and absence of the (400) peak, demonstrating that the (h00)orientation is not yet seen in the membrane.

The membrane was also examined after tertiary growth. FIGS. 6D-E provide SEM images, which show that the membrane surface texture was preserved, although a few mis-oriented outgrowths can be occasionally observed. After this "tertiary growth" step, the membrane was significantly more well-intergrown and nanoscale gaps were eliminated as seen in the cross-sectional view. The membrane thickness somewhat increased to <800 nm. Since the preceding TPAF secondary growth already produced an intergrown and mechanically stable membrane layer, the role of the TEAOH tertiary growth was restricted to final closure of defects. Therefore, the membrane shows excellent adhesion to the alumina hollow fiber support after TEAOH tertiary growth, in contrast with direct TEAOH secondary growth, which, as mentioned earlier, leads to membrane delamination. The XRD pattern (shown in FIG. 6F) shows the dominant peak from the (020) reflection along with the enlarged inset showing the (040) reflection, confirming that the out-of-plane orientation of the membrane is successfully preserved. The 1(101)/1(020) ratio was 0.25, which is still much lower than for the TPAOH medium. The slight increase over the secondary growth value was likely due to the occasional mis-oriented surface intergrowths.

Characterization

Surface and cross-section SEM images of the membranes were collected with a Hitachi SU 8010 scanning electron microscope. XRD patterns were measured at room temperature on a PANalytical X'Pert Pro diffractometer equipped with an incident beam monochromator, so that only the $K\alpha_1$ radiation was used (scan step size:2θ=0.004°). The thin membrane supported on a α-alumina hollow fiber was difficult to characterize with reflection (Bragg-Brentano) XRD analysis due to its curvature. To obtain sharper XRD patterns, membranes were also prepared on flat α-alumina disk supports using exactly the same nanosheet deposition and hydrothermal treatment conditions. TEM images were collected by a FEI Tecnai 30 at an acceleration voltage of 300 kV. Before permeation measurements, the membranes were degassed in the membrane module at 298 K under argon (Ar) gas flow for 8 hr. Single-component permeation measurements were carried out using a membrane module constructed in-house, operated in dead-end mode. The pressure rise on the (initially evacuated) permeate side was recorded versus time and used to calculate permeance and ideal selectivity (defined as the ratio of single-component permeances). Binary gas permeation measurements were obtained in Wicke-Kallenbach mode at the specified temperature. An equimolar butane isomer mixture (50 mL/min) was supplied to the feed side (shell side) of the hollow fiber membrane, while Ar (30 mL/min) was used as a sweep gas at the permeate side (bore side). Both feed and permeate were maintained at atmospheric pressure. The permeate was analyzed by an online gas chromatography unit (GC2014, Shimadzu) to obtain the compositions and fluxes of the two isomers. This data was used to calculate the permeances of each component (i.e., the flux divided by the partial pressure driving force across the membrane) and the separation factor (i.e., the ratio of the mole fractions of the more permeable gas and the less permeable gas in the permeate divided by the same ratio of mole fractions in the feed). The same permeation procedures were used to test the separation properties of n-butane/methane and propane/methane mixtures at the desired feed compositions, with Ar (60 mL/min) as a sweep gas.

Results

Figure 7A:
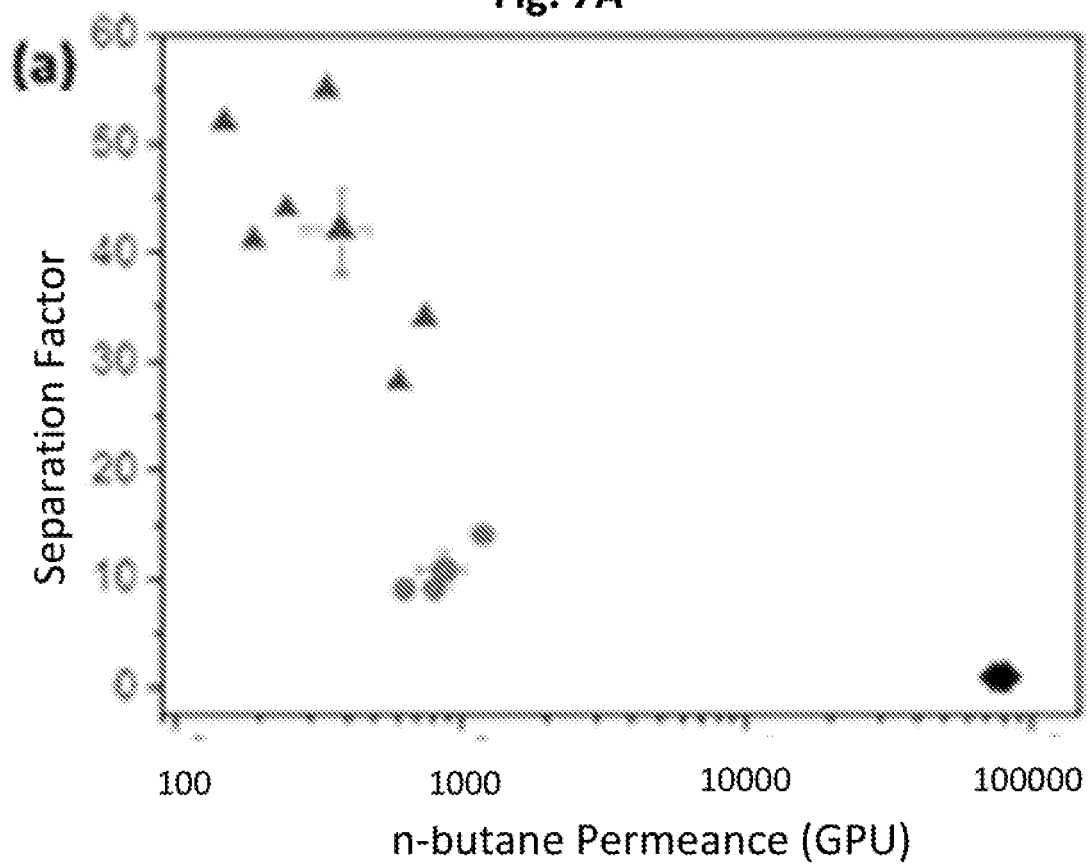
FIG. 7A provides equimolar n-butane/i-butane separation performance of MFI membranes at 298K after multiple processing steps, in which MFI nanosheets are shown in diamonds, after TPA-F secondary growth in circles, and after TEAOH tertiary growth in triangles.
Figure 8A:
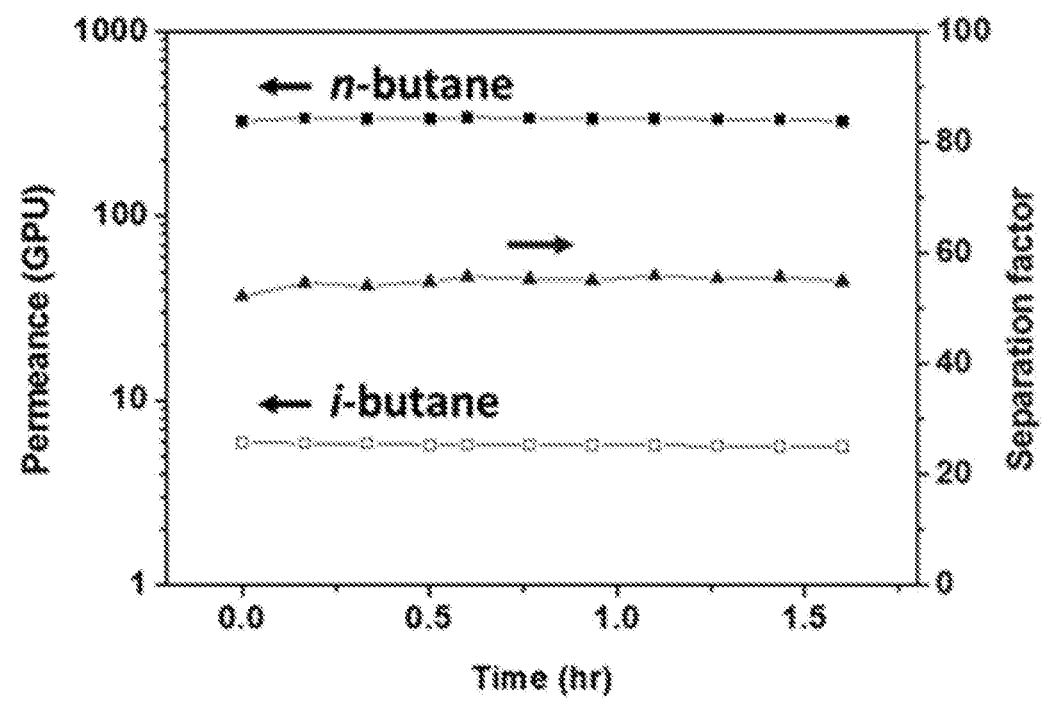
FIG. 8A provides a plot of on-stream n-butane/i-butane separation performation of a membrane after tertiary growth (TT-4 from Table 1) measured up to 1.5 hours, and FIG. 8B provides a plot of on-stream n-butane/i-butane separation performation of a membrane after tertiary growth (TT-4 from Table 1) measured up to 60 hours, in accordance with an exemplary embodiment of the present invention.
Figure 8B:
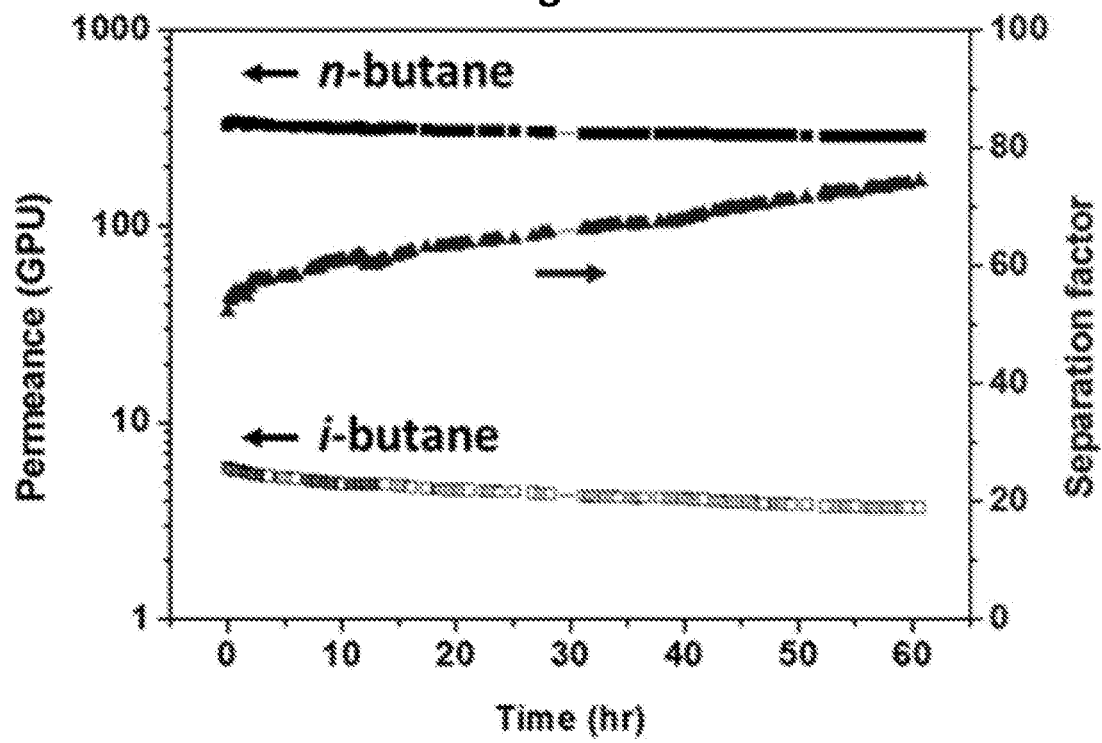

The relationship of the membrane microstructures after each hydrothermal treatment and their separation properties were analyzed. The membrane molecular sieving properties after TPAF treatment ("secondary growth") and TEAOH treatment ("tertiary growth") were evaluated by the separation of butane isomers. Equimolar n-butane/i-butane gas mixture separation performance was measured at 298 K using nine independently fabricated hollow fiber membranes, three of which were measured after the secondary treatment step and the remaining si were measured after both secondary and tertiary treatment steps. Measurements were also made with the initial 2D MFI nanosheet coatings as a baseline. FIG. 7A shows the data from individual membrane samples as well as the averages from the samples at each of the three stages of processing, and Table 1 lists all the numerical values. While the initial nanosheet coating show very high permeances and no selectivity, clear and progressive molecular sieving effects are observed for all the secondary and tertiary-treated membranes. The secondary treatment leads to a large decrease in n-butane permeance relative to the nanosheet coating and a significant increase in separation factor to ~10. Tertiary treatment results in a large increase in separation factor to >40 and a moderate decrease in n-butane permeance. These findings are fully consistent with the main microstructural events occurring during secondary treatment (filling of bulk voids between the nanosheets but incomplete closure of nanoscopic gaps) and tertiary treatment (filling of nanoscale gaps and some increase in membrane thickness). After tertiary treatment of MFI membranes exhibit excellent n-butane permeance of 382±100 GPU and a high n-butane/i-butane mixture separation factor of 42±4 at 298 K. Based upon the kinetic diameters of n-butane (0.43 nm) and i-butane (0.53 nm) as well as preferential adsorption of n-butane at lower pressures, MFI membranes are known to be selective for n-butane. For consistency, permeation data from all membranes are reported after 1.5 hr of post-degassing measurement, at which the permeance and separation factor reach a nominal steady state, as shown in FIG. 8A-B. However, it is known that longer measurements show a slow decrease in permeance with time, which has been attributed to small concentrations of impurity hydrocarbons in the butane feed that result in a much longer time requirement to approach a true steady-state. Therefore, one membrane was operated for up to 60 hours on-stream, as shown in FIG. 8B. A slow decrease of the permeances of both n-butane and i-butane (15% and 36%, respectively) was observed. The separation factor increased by about 35% to >75 while still maintaining a high n-butane permeance of 288 GPU.

TABLE 1

| Membrane sample | Permeance (CPU) | | n-butane/i-butane Separation factor |
|---|---|---|---|
| | n-butane | i-butane | |
| Nanosheets coating layer (NS)-1* | 74000 | 74400 | 1 |
| NS-2 | 80200 | 80400 | 1 |
| NS-3 | 81700 | 81100 | 1 |
| Average | 78600 ± 2400 | 78600 ± 2100 | 1 ± 0 |
| Secondary treatment (ST)-1 | 1201 | 77 | 14 |
| ST-2 | 639 | 65 | 9 |
| ST-3 | 81.1 | 80 | 9 |
| Average | 884 ± 166 | 74 ± 4 | 11 ± 2 |
| Tertiary treatment (TT)-1 | 754 | 20 | 34 |
| TT-2 | 189 | 6 | 41 |
| TT-3 | 61.1 | 20 | 28 |
| TT-4 | 340 | 6 | 55 |

TABLE 1-continued

| Membrane sample | Permeance (CPU) | | n-butane/i-butane Separation factor |
|---|---|---|---|
| | n-butane | i-butane | |
| TT-5 | 149 | 3 | 57 |
| TT-6 | 247 | 5 | 44 |
| Average | 382 ± 100 | 10 ± 3 | 42 ± 4 |

*Nanosheets coating obtained from a 0.01 wt. % coating suspension

Figure 7B:
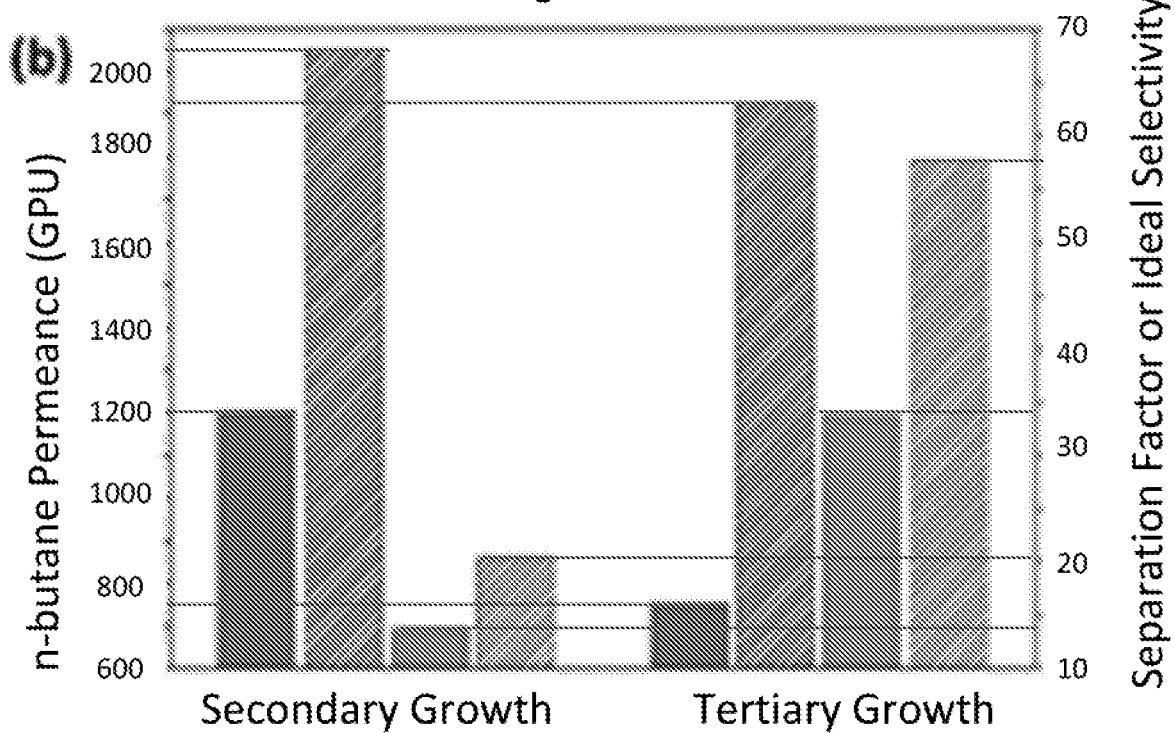
FIG. 7B shows a comparison of unary and binary butane isomer permeation after secondary (ST-1 in Table 1) and tertiary growth (TT-1 in Table 1) at 298K for binary n-butane permeance (left bars), unary n-butane permeance (second from left bars), binary separation factor (second from right bars), and unary selectivity (right bars), in accordance with an exemplary embodiment of the present invention.
Figure 9A:
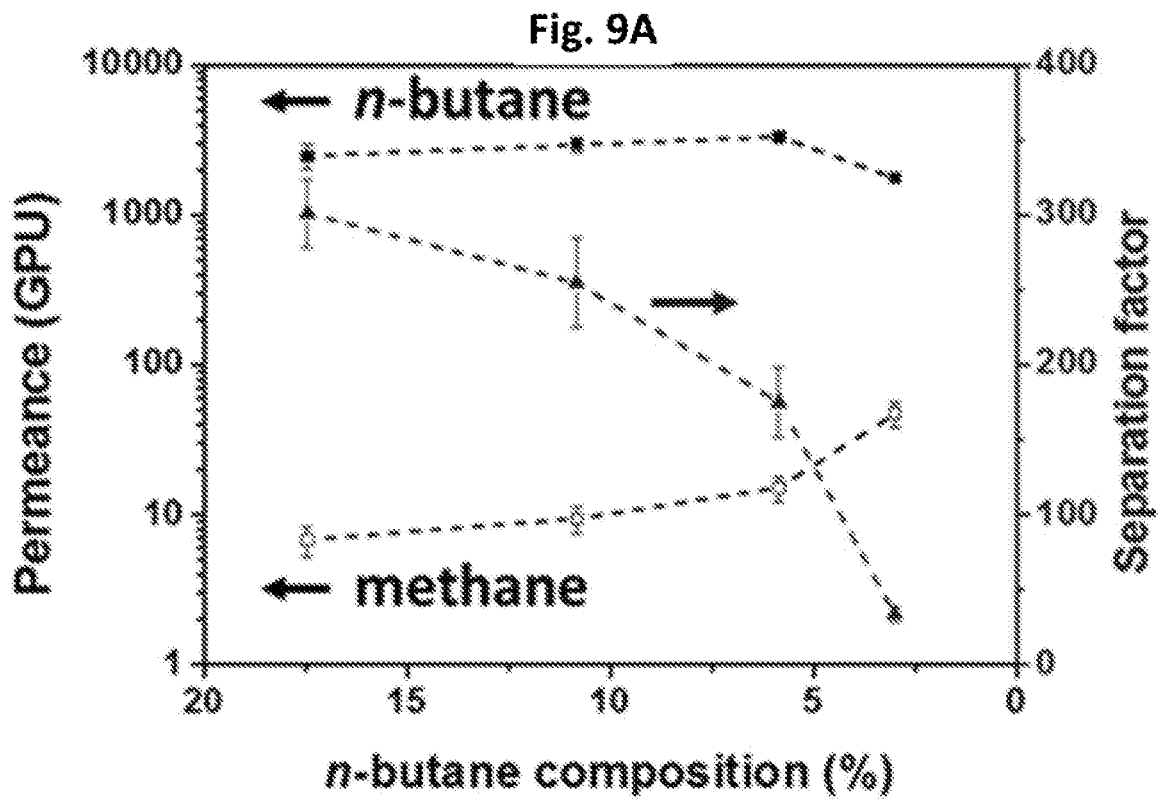
Figure 9B:
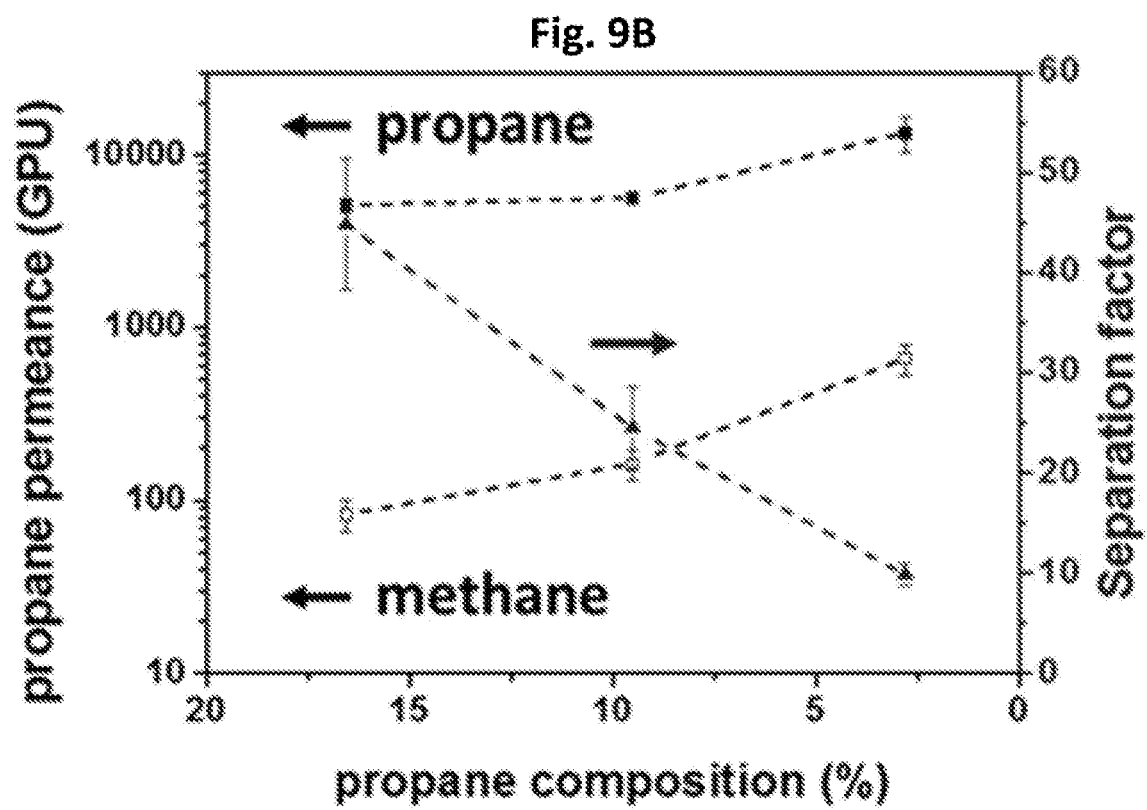

Although mixture permeation data allow evaluation of the actual separation characteristics, they are affected by competitive adsorption and diffusion. Unary (single-component) data provide a cleaner characterization of the microstructural quality. FIG. 7B compares binary and unary permeation data after secondary and tertiary treatments. In both cases, the unary n-butane permeances and selectivities are considerably higher than the corresponding binary permeances and separation factors. In binary permeation, (i-butane competes to a certain extent with n-butane in the straight (OkO) channels of MFI, reducing the n-butane permeance and selectivity. In unary permeation, the membrane (particularly after tertiary treatment) shows very high n-butane selectivity and permeance. This indicates the excellent microstructural quality of the membrane. Further, the difference between binary and unary cases is much more pronounced after tertiary treatment than after secondary treatment alone. After secondary treatment, some permeation still occurs through non-selective nanoscopic defects. After tertiary treatment, practically all permeation is through MFI pores wherein competitive effects are rather strong. Table 2 compares the results of the present work (the last two entries) with previous reports (all other entries) of MFI membranes (made by conventional polycrystalline film growth as well as with 20 MFI nanosheets) and other membrane types (polymeric, mixed matrix, ZIF). The present work is the first to report highly (0k0)-oriented MFI membranes on hollow fibers that furthermore have excellent characteristics for butane isomer separation. In relation to MFI membranes prepared using Stöber silica-derived disk supports that show a separation factor of ~58 (average from Table 2), the present membranes have quite comparable separation factors (~42 after 1.5 hr and ~75 after 60 hr). An exact comparison of separation factors between two selective membrane types may have only limited value, but possible reasons for the difference include the hydrothermal growth mechanisms (e.g., delivery of silica reactants from support versus from liquid phase as well as the SDAs), different microstructures after calcination of curved (fiber) versus flat (disk) membranes, and different measurement times. Finally, the removal of natural gas liquid (NGL) components such as n-butane and propane from methane, currently carried out by cryogenic distillation, was investigated. In binary permeation measurements over a realistic range of n-butane contents in methane (FIG. 9A), MFI membranes exhibit exceptionally high permeance (2000-3000 GPU) and n-butane separation factor (35-300). For propane (FIG. 9B), permeances of 5000-10000 GPU and separation factors of 10-45 are seen. Selective permeation of higher hydrocarbons from mixtures with methane is due to their strong adsorption selectivity in MFI, as confirmed by unary data (FIG. 9C) wherein methane permeates much faster than n-butane and propane.

TABLE 2

| Seed type | Out-of-plane Orientation | Thickness (μm) | Support type | Temperature (K) | n-butane permeance [GPU] | n-butane/i-butane Separation Factor or Ideal selectivity* |
|---|---|---|---|---|---|---|
| — | random | ~7 | α-alumina disk | 298 | 90 | 52 |
| — | random | >100 | Stainless steel tube | 298 | 6 | 5 |
| — | random | >100 | Stainless steel tube | 298 | 105 | 5 |
| Plate-like | (h00) | 7.5 | Silica-coated α-alumina disk | 298 | 299 | 18 |
| Randomly oriented | random | 15 | Silica-coated α-alumina disk | 298 | 239 | 46 |
| Randomly oriented | (00l) | 8 | α-alumina disk | 298 | 299 | 35 |
| — | random | 50 | unsupported | 298 | 239 | 48 |
| — | — | 35 | TiO$_2$-coated stainless steel disk | 303 | 149 | 55 |
| — | random | 0.5 | Asymmetric α-alumina disc | 298 | 2927 | 9 |
| Randomly oriented | (00l) | 30 | Silica-coated α-alumina disk | 295 | 179 | 62 |
| Randomly oriented | (00l) | 15 | α-alumina disk | 295 | 60 | 71 |
| Randomly oriented | (00l) | 30 | α-alumina disk | 295 | 90 | 40 |
| — | random | 5 | α-alumina disk | 298 | 90 | 52 |
| — | — | 30-50 | Stainless steel disk | 303 | 149 | 25 |
| — | — | 15 | TiO$_2$ coated stainless steel disk | 303 | 418 | 45 |
| — | — | 30 | TiO$_2$ coated stainless steel disk | 303 | 209 | 28 |
| b-oriented MFI plate | (0k0) | 1 | Silica-coated α-alumina disk | 323 | 538 | 5 |
| — | (0k0) | 2-3 | Silica-coated α-alumina disk | 298 | 6* | 3* |
| Exfoliated nanosheets | (0k0) | 0.1-0.25 | Stober silica - coated sintered silica fiber disk | 298 | 1284 | 62 |
| Exfoliated nanosheets | (0k0) | 0.1-0.25 | Stober silica - coated sintered silica fiber disk | 298 | 699 | 47 |
| Directly synthesized nanosheets | (0k0) | 0.25-1 | Stober silica - coated sintered silica fiber disk | 298 | 597 | 50 |
| Directly synthesized nanosheets | (0k0) | 0.5-1.5 | Stober silica - coated sintered silica fiber disk | 295 | 290 | 64 |
| Directly synthesized nanosheets | (0k0) | 0.5-1.5 | Stober silica - coated sintered silica fiber disk | 295 | 986 | 69 |
| Randomly oriented seed | (h0l) | 8 | α-alumina tube | 333 | 714 | 27 |
| 6FDA-DAM polymer | — | 30 | unsupported | 373 | 37 ± 2* | 21 ± 2* |
| MFI (35 wt %)-6FDA-DAM mixed matrix | — | 30 | unsupported | 373 | 78 ± 2* | 23 ± 2* |
| ZIF-90 | — | 3.1 | Carbon hollow fiber | 298 | 60 | 12 |

TABLE 2-continued

| Seed type | Out-of-plane Orientation | Thickness (μm) | Support type | Temperature (K) | n-butane permeance [GPU] | n-butane/i-butane Separation Factor or Ideal selectivity* |
|---|---|---|---|---|---|---|
| *Directly synthesized nanosheets | (0k0) | 0.5 | α-alumina hollow fiber | 298 | 884 ± 166 | 11 ± 2 |
| | | | | 298 | 2047* | 20* |
| **Directly synthesized nanosheets | (0k0) | 0.8 | α-alumina hollow fiber | 298 | 382 ± 100 | 42 ± 4 |
| | | | | 298 | 1923* | 58* |

*After secondary growth according to an embodiment of the present invention.
**After tertiary growth according to an embodiment of the present invention.

Example 2: One-Step Gel Conversion Treatment

Characterization Methods

XRD patterns were measured on a PANalytical X'Pert Pro diffractometer at room temperature using Cu Kα radiation and a scanning range of 5–40° 2θ. SEM images of zeolite crystals and membranes were collected with a Hitachi SU 8010 microscope operating at 5 kV and 10 μA. EDX mapping analysis on zeolite crystals and membrane cross-sections was conducted with a Hitachi SU 8230 microscope equipped with an Oxford Instruments X-MaxN Silicon Drift Detector. A Micromeritics Autopore IV mercury porosimeter was used to obtain the pore size distribution of alumina hollow fibers.

Overall Membrane Fabrication Process

Figure 10:
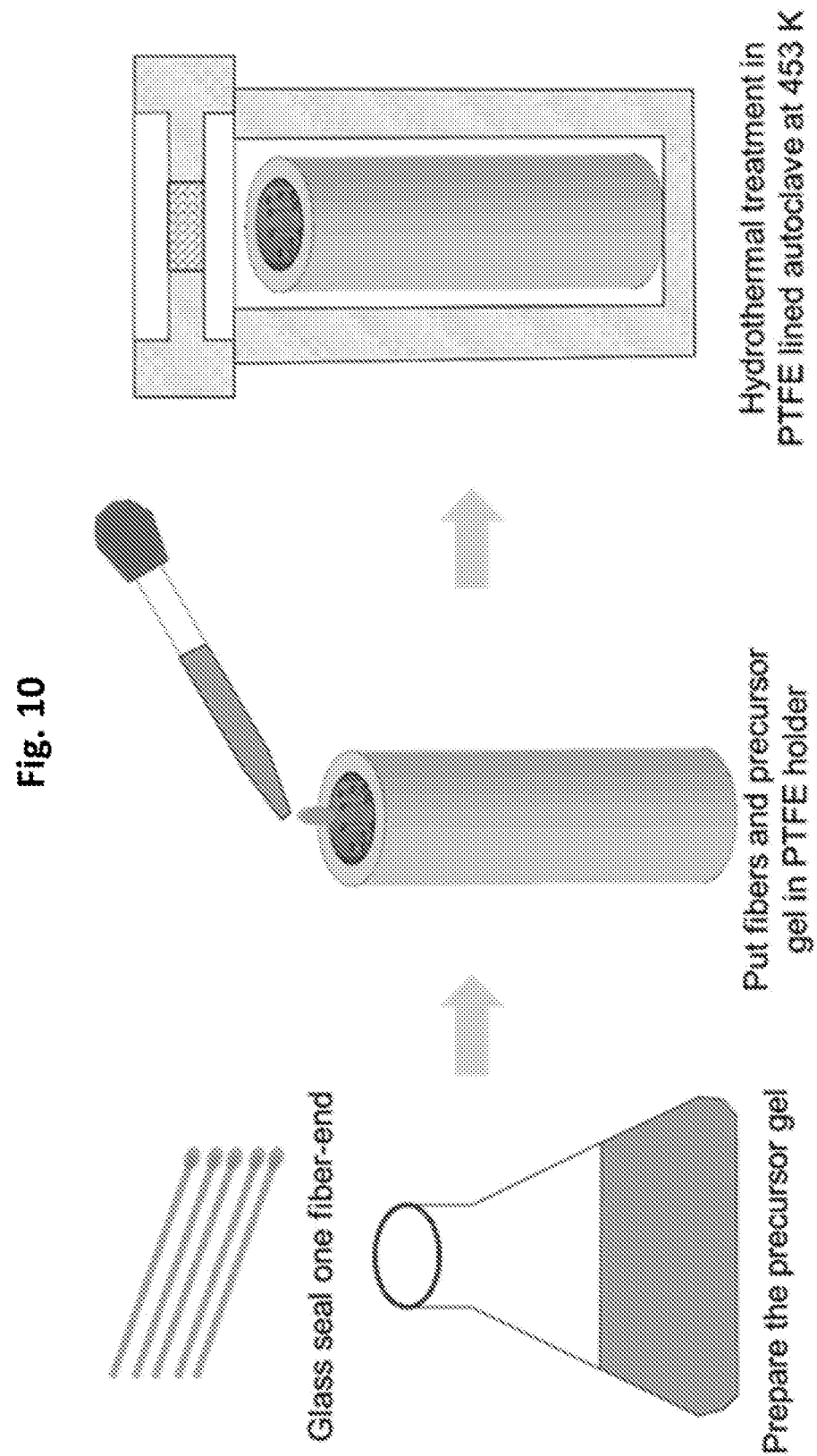
FIG. 10 provides a schematic of a method of preparing a zeolite membrane, in accordance with an exemplary embodiment of the present invention.

FIG. 10 provides a general schematic of the fabrication process used in this example. Generally, the precursor gel was prepared and one end of each fibers was glass sealed. The sealed fibers and precursor gel was placed in a PTFE holder. Hydrothermal treatment in the PTFE lined autoclave was carried out at 453 K.

Alumina Hollow Fiber Preparation

The spinning dope suspension had a composition (wt. %) of 38.0 NM P:6.8 PES:54.7 $Al_2O_3$:0.5 PVP, in which NMP n-methyl-2-pyrrolidone, PES polyethersulfone, and PVP=polyvinylpyrrolidone. Hollow fiber spinning was conducted with dope and bore fluid flow rates of 120 and 80 mL/h, respectively. DI water and tap water were used as the bore fluid and external coagulant fluid respectively. Both the dope and water bath were kept at room temperature. The air gap was 3 cm. The fibers fell freely into the water bath bucket and were collected, soaked in DI water for 3 days (with the water changed daily) to exchange the residual solvent, and thoroughly dried. The green fibers were then sintered at 873 K for 2 h followed by 6 h at 1673 K with a temperature ramping rate of 5 K/min. To glass-seal one end of the fibers, one fiber end was dipped into Ducan 1001 precursor gel for 10 s. It was then dried in air for 1 h before subjecting 2 h heat treatment at 1223 K.

Figure 15:
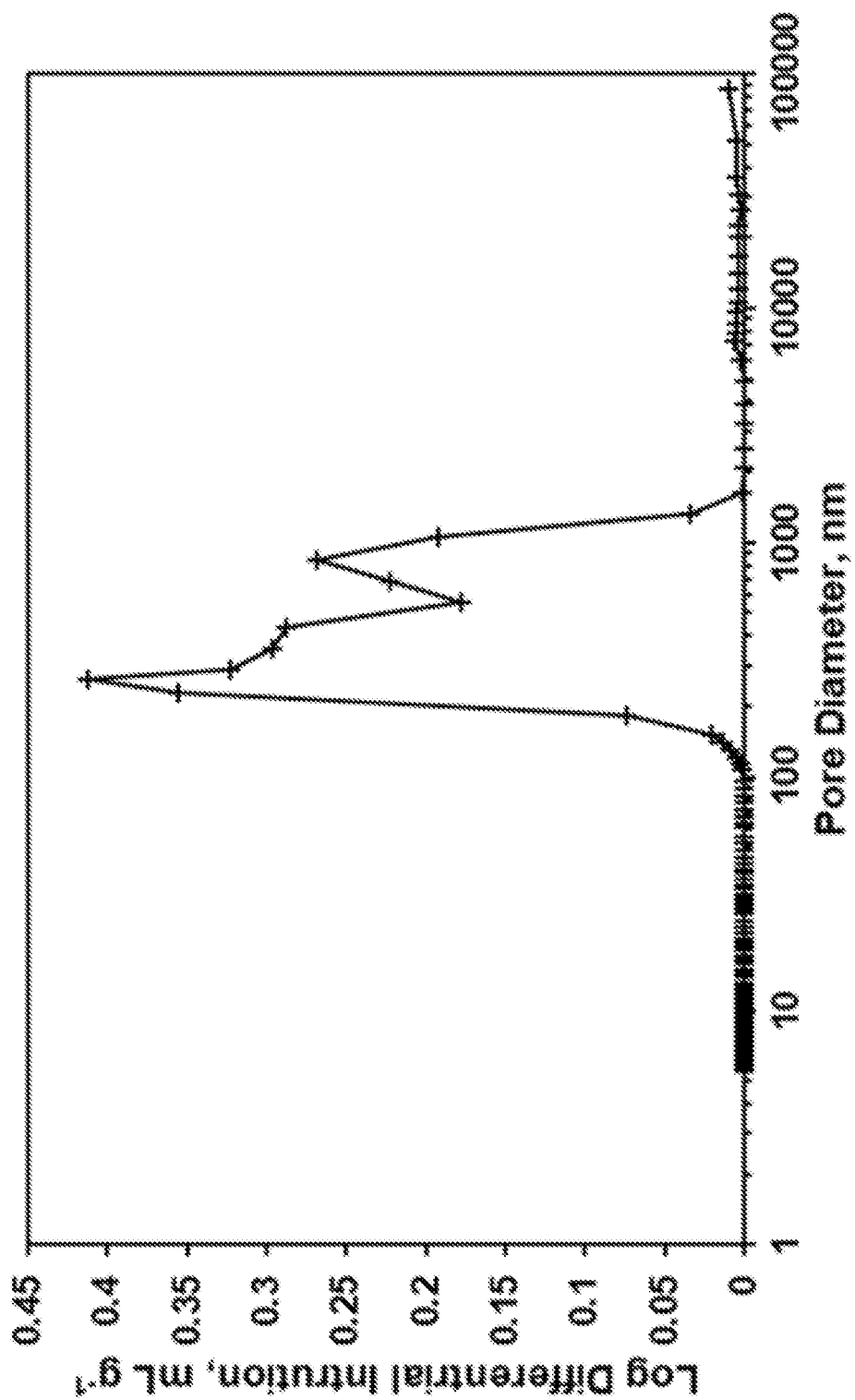
FIG. 15 is a mercury porosimetry profile of the alumina hollow fiber substrate of FIGS. 11A-11C, which shows an average pore size of 420 nm and 46% porosity as determined from analysis of the mercury porosimetry profile.

Preparation of CHA Membrane Growth Precursor Gel 0.64 g of sodium hydroxide (99.99% trace metals basis, Sigma Aldrich) was first added to 33.82 g of trimethyladamantylammonium hydroxide solution (TMAdaOH, 20% wt. in water, SACHEM) in a polymethylpentene (PMP) flask under stirring. Then, 0.076 g of aluminum hydroxide (50-57% wt. of $Al_2O_3$, Sigma Aldrich) was added and stirred for 5 min, after which 16.0 g of Ludox SM30 (30 wt. % in water, Sigma Aldrich) was added dropwise. The CHA crystal mass added to the membrane growth precursor gel was fixed at 5% of the equivalent mass of $SiO_2$ in the gel phase (i.e., 0.24 g of CHA crystals were added in the above formulation). The mixture was then evaporated in a silicone oil bath maintained at 373 K to remove excess water. The lost mass was assumed as water for final composition calculation. The mass loss was closely monitored (by periodic weighing) to yield a final precursor molar composition (not including the CHA crystals) of 1.0 $SiO_2$: 0.10 $Na_2O$: 0.005 $Al_2O_3$: 0.40 TMAdaOH: x $H_2O$ (x=5 or 10). Specifically, 31.1 g and 23.9 g of mass loss corresponds to x=5 and 10, respectively. In case slightly more mass was lost than targeted, deionized (DI) water was added to compensate. FIGS. 11A-C provide SEM images of the alumina hollow fibers. FIG. 15 provides a plot of the porosimetry profile of the alumina hollow fibers.

Preparation of CHA Zeolite Crystals for Gel Seeding

A precursor gel with molar composition of 1.0 $SiO_2$: 0.10 $Na_2O$: 0.025 $Al_2O_3$: 0.40 TMAdaOH: 44 $H_2O$ was used for crystal growth. The precursor gel was prepared by mixing 16.91 g of trimethyladamantylammonium hydroxide solution and 12.55 g of DI water in a PMP flask under stirring. Then, 0.32 g of solidum hydroxide and 0.19 g of aluminum hydroxide (50-57% wt. of $Al_2O_3$, Sigma Aldrich) were added and stirred for 5 min. 8.0 g of Ludox SM-30 (30% wt. in water, Sigma Aldrich) was added dropwise. The hydrothermal treatment was conducted at 433 K for 3 days in a Teflonlined autoclave. The product was then centrifuged. The solid was dispersed in DI water and centrifuged for rinsing. This was repeated for several times till the liquid is close to neutral in pH. The resulting SSZ-13 microcrystals had average particle size-3 μm (FIG. 12A). The particles were calcined at 823 K for 6 h. These particles were then used as seeds for a second synthesis. The same synthesis precursor solution, with 0.04 g (about 0.1 wt. % of overall precursor gel) of calcined SSZ-13 microcrystals added as seeds, was used at 453 K for 24 h. The use of seeds promoted secondary nucleation and much smaller crystals were generated (FIG. 12B). The product was washed with DI water and dried before use in preparing the precursor gel for hollow fiber membrane growth. The CHA crystal synthesis is independent of the membrane synthesis, and is carried out in a single batch for use in many membrane fabrication runs.

CHA Membrane and Module Fabrication

To synthesize CHA membranes on the outer surfaces of the hollow fibers, cylindrical PTFE reactors/holders were used in which channels of ¼ inch diameter were drilled. Up to 5 hollow fibers were inserted into each channel with the glass-sealed end at the bottom, and then the previously prepared precursor gel was injected into each channel. The gel level was kept about 0.5 cm lower than the top of the alumina hollow fiber to avoid gel filling into the bore. The PTFE holder was then sealed in an autoclave and heated at 453 K for durations ranging from 6-24 hours. The fibers were then removed, washed with DI water, soaked in DI water for 2 hours, dried in an oven at 333 K, and calcined under air in an oven at 823 K for 10 hours. To make 20 fibers in one batch, a ½ inch diameter channel was drilled, and 20 fibers were inserted. The other membrane preparation procedures were kept identical.

Modules containing 1-20 fibers were fabricated for gas permeation measurements. FIGS. 13A-13C illustrate the preparation of a flow-through single-fiber module and a dead-ended 20-fiber module. For single-fiber module, the glass-sealed end was broken to open the bore before it is sealed in the module. The fiber was sealed in such a way that the effective area for permeation are the section from glass-sealed end to adjacent ~5 cm. After sealing, the effective length for permeation is about 4 cm. The single-fiber module is good for both single gas permeation tests and mixture separation tests. For 20-fiber module, the MFCs available in the testing lab could not provide high enough flow rates to make reasonable mixture separation tests. Therefore, a dead-end module was used for single gas permeation measurements. A dead-end module was used considering that the dead-end module is easier to be fabricated with less concerns of sealing the gaps between fibers or blocking some fiber bores. The fibers were aligned with glass-sealed end facing at the same side. Some epoxy (3M DP110) was applied to a small section of the fiber bundle with about 1 cm distance to the open end, the fibers were then twisted to ensure gaps between the fibers were filled with epoxy. The fibers were then inserted into the ¼ inch stainless steel (SS) tubing and more epoxy was applied to ensure sealing. After curing the epoxy for over 30 min, the glass-sealed side was dipped into epoxy for a few seconds to ensure every fiber end was well covered with epoxy. That dead-ended fiber bundle, as shown in FIG. 13B, was further cured for 24 h. It was then inserted into ½ inch stainless steel tubing, and the gap between ¼ inch and ½ inch tubing was sealed as shown in FIG. 13C. After curing for over 24 h, the module was tested for single gas permeation by introducing feed gas to the shell side and monitor pressure change in the bore side.

Permeation Measurements and Data Analysis

Figure 14:
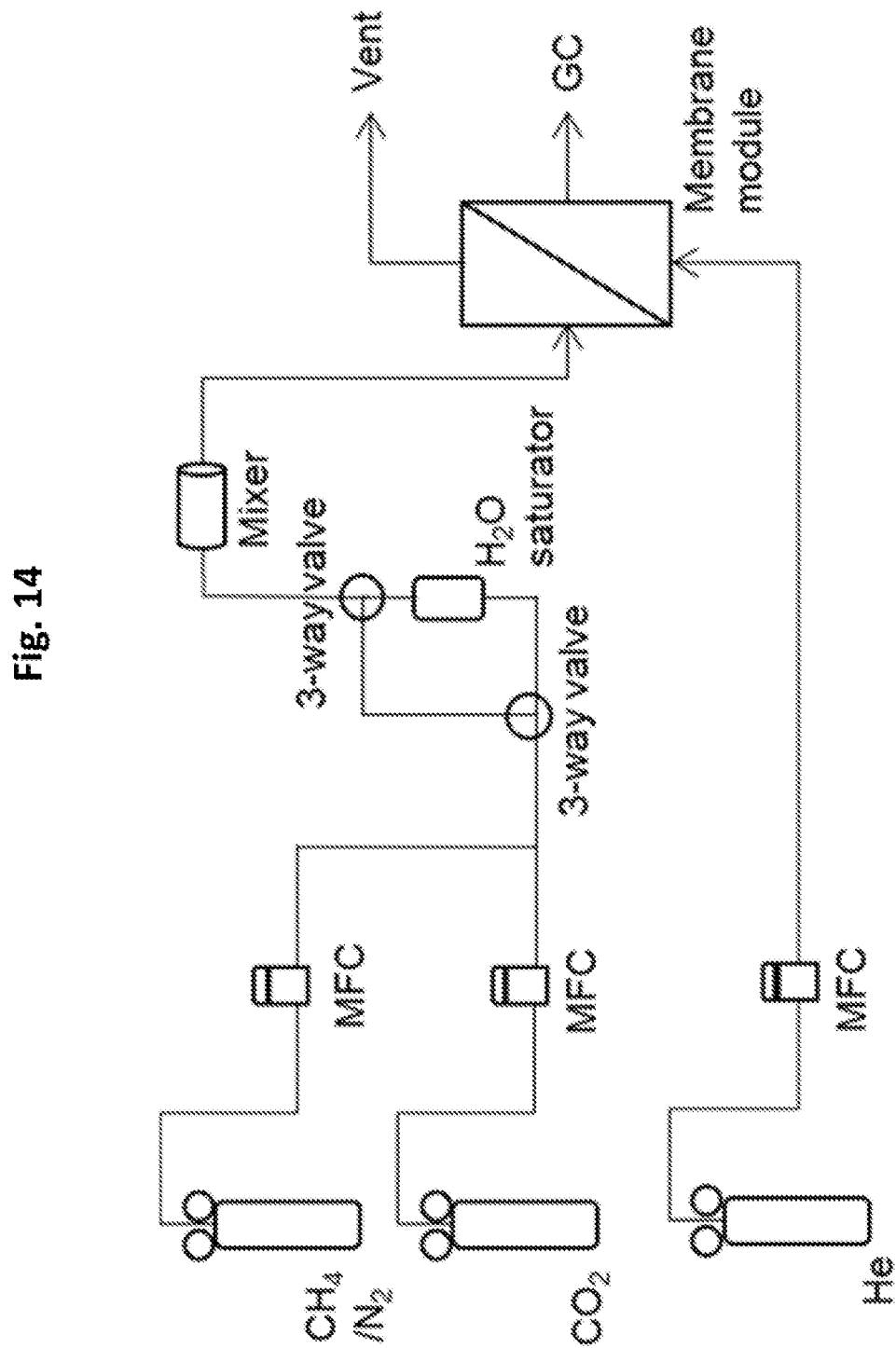
FIG. 14 provides a schematic of a permeation system for $CO_2/CH_4$ or $CO_2/N_2$ mixture separation, in accordance with an exemplary embodiment of the present invention.

Single-gas permeation measurements were performed by the standard pressure-rise method. After degassing the membrane, the feed gas was fed into the zeolite membrane side ("shell side") of the permeation module at a constant pressure of 2 bar. The pressure increase on the permeate side was recorded over time using a transducer (Omega), and the linear region of the pressure-time curve was used along with the ideal gas law to calculate the molar flux through the membrane. For mixture permeation, the schematic of the apparatus is shown in FIG. 14. The gas components were combined at a mixer before entering the feed side of the module at a pre-determined pressure. Helium (He) was used as the sweep gas at the permeate side with 1 bar permeate pressure. The composition of permeate stream was analyzed online by a gas chromatograph (Shimadzu GC-2014) using columns calibrated for $CO_2$, $CH_4$, $N_2$, and hydrocarbons. 100 mL/min flow rate was used for both the feed and sweep gas. To create humidified feeds, the dry feed gas mixture was passed through a water bubbler and saturated with water vapor at 294 K before entering the module. The pressure of the feed gas was adjusted using a backpressure regulator (Cole Parmer, 0-20 bar range).

The permeance of gas $i(P_{m,i})$, permselectivity (i.e. ideal selectivity) of gas i over $j(\alpha^0_{i/j})$, and mixture separation factor of i over $j(\alpha_{i/j})$ are respectively defined as:

$$P_{m,i} = \frac{Q}{A_m \cdot t \cdot \Delta P_i} \qquad \text{Equation 1}$$

$$\alpha^0_{i/j} = P^o_{m,i}/P^o_{m,j} \qquad \text{Equation 2}$$

$$\alpha_{i/j} = \frac{y_i/y_j}{x_i/x_j} \qquad \text{Equation 3}$$

$$(i \neq j)$$

where Q is the moles of component i permeated through the membrane over a time period of t(s); $\Delta P_i$ is the partial pressure difference (i.e., $\Delta P_i = P_{i,f} - P_{i,p}$, where $P_{i,f}$ and $P_{i,p}$ are the partial pressures of gas component i in the feed and permeate sides, respectively); $P^o_{m,i}$ and $P^o_{m,j}$ are pure gas permeance of gas i and j, respectively; and x and y are molar fractions of the feed and permeate gas, respectively.

Table 3 provides a summary of the $CO_2/CH_4$ mixture separation performance of an exemplary membrane of the present invention (entry 1 in the table) compared to conventional zeolite membranes (entries 2-14 in the table). HF=hollow fiber. ΔP means the overall transfer membrane pressure difference.

TABLE 3

| Entry No. | Zeolite type | Nominal pore size, nm | $CO_2$, GPU | $CO_2/CH_4$ | T, K | ΔP, bar | Feed | Support |
|---|---|---|---|---|---|---|---|---|
| 1 | CHA (SSZ-13) | 0.38 | 3300 | 170 | 294 | 1 | dry | HF |
| 1 | | | 1300 | 260 | 294 | 1 | humid | |
| 1 | | | 1900 | 97 | 294 | 5 | dry | |
| 1 | | | 1100 | 160 | 294 | 5 | humid | |
| 2 | CHA (SiO$_2$) | 0.38 | 23000 | 32 | 295 | 8 | dry | Disk |
| 3 | | | 12000 | 130 | 298 | 1 | dry | Tube |
| 3 | | | 150 | 10 | 298 | 1 | humid | |
| 3 | | | 4800 | 38 | 298 | 5 | dry | |
| 3 | | | 1200 | 23 | 298 | 5 | humid | |
| 4 | CHA (SSZ-13) | 0.38 | 900 | 35 | 293 | 5 | dry | HF |
| 4 | | | 210 | 42 | 293 | 5 | humid | |
| 5 | | | 600 | 300 | 303 | 1 | dry | Tube |
| 6 | | | 115 | 95 | 295 | 1 | dry | HF |
| 7 | CHA (SAPO-34) | 0.38 | 3500 | 160 | 298 | 1 | dry | HF |
| 8 | | | 8200 | 67 | 295 | 2 | dry | Tube |
| 9 | AEI (ALPO-18) | 0.38 | 1940 | 220 | 298 | 2 | dry | Tube |

TABLE 3-continued

| Entry No. | Zeolite type | Nominal pore size, nm | CO$_2$, GPU | CO$_2$/CH$_4$ | T, K | ΔP, bar | Feed | Support |
|---|---|---|---|---|---|---|---|---|
| 10 | DDR | 0.36 | 750 | 180 | 298 | 1 | dry | Tube |
| 10 | | | 360 | 100 | 298 | 1 | humid | |
| 11 | | | 210 | 280 | 301 | 1 | dry | Tube |
| 11 | | | 120 | 330 | 301 | 1 | humid | |
| 12 | T-type (OFF/ERI) | 0.36 | 140 | 400 | 308 | 0 | dry | Tube |
| 13 | MFI (Si) | 0.55 | 16000 | 3.4 | 295 | 8 | dry | Disk |
| 14 | FAD (NaX) | 0.74 | 840 | 28 | 308 | 0 | dry | Tube |

Table 4 provides a summary of the CO2/N2 mixture separation performance of an exemplary membrane of the present invention (entry 1 in the table) compared to conventional zeolite membranes (entries 2-11 in the table). HF=hollow fiber.

TABLE 4

| Entry No. | Zeolite type | Nominal pore size, nm | CO$_2$, GPU | CO$_2$/N$_2$ | T, K | ΔP, bar | Feed | Support |
|---|---|---|---|---|---|---|---|---|
| 1 | CHA (SSZ-13) | 0.38 | 2800 | 11 | 294 | 0 | dry | HF |
| 1 | | | 900 | 30 | 294 | 0 | humid | |
| 2 | | | 570 | 11 | 298 | 1.4 | dry | Tube |
| 3 | | | 840 | 10 | 293 | 5 | dry | HF |
| 3 | | | 210 | 18 | 293 | 5 | humid | |
| 4 | CHA (SAPO-34) | 0.38 | 3600 | 32 | 295 | 1.4 | dry | Tube |
| 4 | | | 310 | 10 | 378 | 1 | dry | |
| 4 | | | 200 | 10 | 378 | 1 | humid | |
| 5 | AEI (ALPO-18) | 0.38 | 1880 | 45 | 298 | 2 | dry | Tube |
| 6 | DDR | 0.36 | 180 | 30 | 303 | 0 | dry | Disk |
| 7 | T-type (OFF/ERI) | 0.36 | 160 | 81 | 308 | 0 | dry | Tube |
| 8 | MFI (ZSM-5) | 0.55 | 110 | 54.3 | 298 | 3 | dry | Tube |
| 9 | | 0.55 | 7800 | 13.7 | 300 | / | dry | Tube |
| 9 | MFI (B-ZSM-5) | 0.55 | 480 | 6.3 | 300 | 0.7 | dry | Tube |
| 9 | | | 360 | 7 | 300 | 0.7 | humid | |
| 10 | FAU (NaY) | 0.74 | 2700 | 39 | 308 | 0 | dry | Tube |
| 11 | | | 63 | 31 | 296 | 0 | dry | Disk |
| 11 | | | 1 | 0.6 | 296 | 0 | humid | |

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method of manufacturing a zeolite membrane comprising:
   coating at least a portion of a porous substrate with a membrane comprising nanomaterials; and
   hydrothermally treating the membrane comprising:
   a first hydrothermal treatment with a first substance; and
   a second hydrothermal treatment with a second substance;
   wherein the second hydrothermal treatment occurs after the first hydrothermal treatment.

2. The method of claim 1, wherein the first substance comprises tetrapropylammonium fluoride (TPAF).

3. The method of claim 2, wherein the second substance comprises tetraethylammonium hydroxide (TEAOH).

4. The method of claim 1, wherein the second substance comprises tetraethylammonium hydroxide (TEAOH).

5. The method of claim 1, wherein the first hydrothermal treatment occurs over a period of between 6 hours and 12 hours.

6. The method of claim 1, wherein the second hydrothermal treatment occurs over a period of between 40 hours and 56 hours.

7. The method of claim 1, wherein the porous substrate comprises an α-alumina porous hollow fiber.

8. The method of claim 1, wherein hydrothermally treating the membrane increases adhesion of the membrane to the porous substrate.

9. The method of claim 1, wherein the nanomaterials comprise nanosheets; and
wherein hydrothermally treating the membrane fills in at least a portion of voids located between the nanosheets.

10. The method of claim 1, wherein the membrane has a thickness of less than 800 nm after the hydrothermal treatment.

11. The method of claim 1, wherein out-of-plane orientation of the membrane is preserved after the hydrothermal treatment.

12. The method of claim 1, wherein the coating occurs via a vacuum filtration process.

13. The method of claim 1, wherein after the hydrothermal treatment, the membrane has:
an n-butane permeance in a range of 100-10,000 gas permeation units; and
a separation factor for n-butane/i-butane in a range of 10-100 at room temperature with a pressure difference in a range of 1-20 bar across the membrane.

14. The method of claim 1, wherein after the hydrothermal treatment, the membrane has a separation factor for n-butane/methane in a range of 50-500 at room temperature with a pressure difference in a range of 1-20 bar across the membrane.

15. The method of claim 1, wherein after the hydrothermal treatment, the membrane has a separation factor for propane/methane in a range of 10-100 at room temperature with a pressure difference in a range of 1-20 bar across the membrane.

16. The method of claim 1, wherein the membrane is selected from the group consisting of a chabazite (CHA)-type zeolite membrane and a (MFI)-type zeolite membrane.

17. The method of claim 1, wherein the coating comprises coating with a precursor gel.

18. A method of manufacturing a zeolite membrane comprising:
coating at least a portion of a porous substrate with a precursor gel; and
heating the porous substrate and the precursor gel comprising:
a first hydrothermal treatment with a first substance; and
a second hydrothermal treatment with a second substance;
wherein the second hydrothermal treatment occurs after the first hydrothermal treatment.

19. The method of claim 18, wherein the precursor gel comprises silicon dioxide ($SiO_2$) and water ($H_2O$) in a $SiO_2/H_2O$ ratio of 5:1 to 10:1.

20. The method of claim 18, wherein the precursor gel comprises silicon dioxide ($SiO_2$) and water ($H_2O$) in a $SiO_2/H_2O$ ratio of 5:1.

21. The method of claim 18, wherein the precursor gel is manufactured by a process comprising:
combining sodium hydroxide, a trimethyladamantylammonium hydroxide (TMAdaOH) solution in water, and aluminum hydroxide while stirring to form a first mixture;
adding CHA crystals to the first mixture; and
evaporating at least a portion of the water in the first mixture in a silicone oil bath.

22. The method of claim 18, wherein the precursor gel comprises
silicon dioxide ($SiO_2$);
sodium oxide ($Na_2O$);
aluminum oxide ($Al_2O_3$); and
trimethyladamantylammonium hydroxide (TMAdaOH);
present in a molar composition of 1.0 $SiO_2$: 0.1 $Na_2O$: 0.005 $Al_2O_3$: 0.4 TMAdaOH.

23. The method of claim 1, wherein membrane has carbon dioxide (CO2) permeance in a range of 1,000-20,000 gas permeation units under feed conditions at 0-100% humidity.

24. The method of claim 1, wherein the membrane has a separation factor for carbon dioxide/methane in a range of 50-500 in a 1-7 bar feed pressure range.

25. The method of claim 1, wherein the membrane has a separation factor for carbon dioxide/propane in a range of 100-2,000 in a 1-7 bar feed pressure range.

26. A zeolite membrane manufactured by the method of claim 1.

27. The method of claim 1, wherein the membrane is selected from the group consisting of a chabazite (CHA)-type zeolite membrane and a (MFI)-type zeolite membrane; and
wherein at least one of:
the membrane has carbon dioxide (CO2) permeance in a range of 1,000-20,000 gas permeation units under feed conditions at 0-100% humidity;
the membrane has a separation factor for carbon dioxide/methane in a range of 50-500 in a 1-7 bar feed pressure range; or
the membrane has a separation factor for carbon dioxide/propane in a range of 100-2,000 in a 1-7 bar feed pressure range.

28. The method of claim 19 further comprising:
washing the heat treated porous substrate;
drying the washed porous substrate; and
calcining the dried porous substrate.

29. The method of claim 18, wherein the first hydrothermal treatment occurs at a temperature of between 273 K and 473 K; and
wherein the second hydrothermal treatment occurs at a temperature of between 273 K and 493 K.

30. The method of claim 18, wherein the first hydrothermal treatment occurs for a time period of between 1 hour and 72 hours; and
wherein the second hydrothermal treatment occurs for a time period of between 12 hours and 82 hours.

31. The method of claim 19, wherein membrane has carbon dioxide ($CO_2$) permeance in a range of 1,000-20,000 gas permeation units under feed conditions at 0-100% humidity.

32. The method of claim 19, wherein the membrane has a separation factor for carbon dioxide/methane in a range of 50-500 in a 1-7 bar feed pressure range.

33. The method of claim 19, wherein the membrane has a separation factor for carbon dioxide/propane in a range of 100-2,000 in a 1-7 bar feed pressure range.

34. A zeolite membrane manufactured by the method of claim 19.

* * * * *